United States Patent [19]
Ando

[11] Patent Number: 6,139,240
[45] Date of Patent: *Oct. 31, 2000

[54] ORTHOGONAL TYPE BRANCHING CONVEYER FOR DIVERTING ARTICLES CARRIED BY A CONVEYER IN AN AUTOMATED WAREHOUSE

[75] Inventor: Naoyuki Ando, Komaki, Japan

[73] Assignee: Daifuku Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/198,359

[22] Filed: Nov. 24, 1998

[30] Foreign Application Priority Data

Nov. 26, 1997 [JP] Japan .................................. 9-323679

[51] Int. Cl.⁷ .............................. B65G 1/04; B65G 47/46
[52] U.S. Cl. .......................... 414/267; 414/271; 414/285; 198/370.02
[58] Field of Search ..................................... 414/268, 269, 414/270, 271, 272, 278, 285; 198/370.02

[56] References Cited

U.S. PATENT DOCUMENTS

| | | | |
|---|---|---|---|
| 2,412,137 | 12/1946 | Fink ..................................... | 414/271 X |
| 2,942,715 | 6/1960 | Miller ............................. | 198/370.07 X |
| 2,942,718 | 6/1960 | Bührer ............................... | 198/370.07 |
| 3,144,926 | 8/1964 | Edelman .............................. | 414/271 X |
| 3,490,616 | 1/1970 | Castaldi .............................. | 414/285 X |
| 3,613,910 | 10/1971 | Weir ................................... | 414/285 X |
| 3,863,777 | 2/1975 | Murata ................................ | 414/285 X |
| 4,003,296 | 1/1977 | Wentz ................................. | 414/269 X |
| 4,189,273 | 2/1980 | Soderstrom et al. ................... | 414/285 |
| 5,038,912 | 8/1991 | Cotter ................................. | 198/370.02 |
| 5,125,782 | 6/1992 | Goldschmidt et al. ............. | 414/285 X |
| 5,127,510 | 7/1992 | Cotter et al. ....................... | 198/370.02 |
| 5,165,515 | 11/1992 | Nitschke et al. ............... | 198/370.02 X |
| 5,564,879 | 10/1996 | Noguchi ............................. | 414/285 X |
| 5,595,279 | 1/1997 | Wilkins et al. ..................... | 198/370.02 |
| 5,613,591 | 3/1997 | Heit et al. .......................... | 198/370.02 |

*Primary Examiner*—Robert P. Olszewski
*Assistant Examiner*—Gerald J. O'Connor
*Attorney, Agent, or Firm*—Webb Ziesenheim Logsdon Orkin & Hanson, P.C.

[57] ABSTRACT

An automated warehouse includes a plurality of article storage shelves having a plurality of article storage sections arranged therein. An article may be conveyed from a main conveyer at one end of the shelves through a branching conveyer to a transfer apparatus. The transfer apparatus can transfer the article to and from the storage section. The branching conveyer extends substantially normal to the main conveyer. The main n conveyer includes a plurality of slats extending normal to a conveying direction and a plurality of pushing shoes corresponding with the slats. The main conveyer additionally includes a device for aligning and moving a predetermined number of the pushing shoes at a position where the branched conveyer is located.

15 Claims, 24 Drawing Sheets

Fig. 6
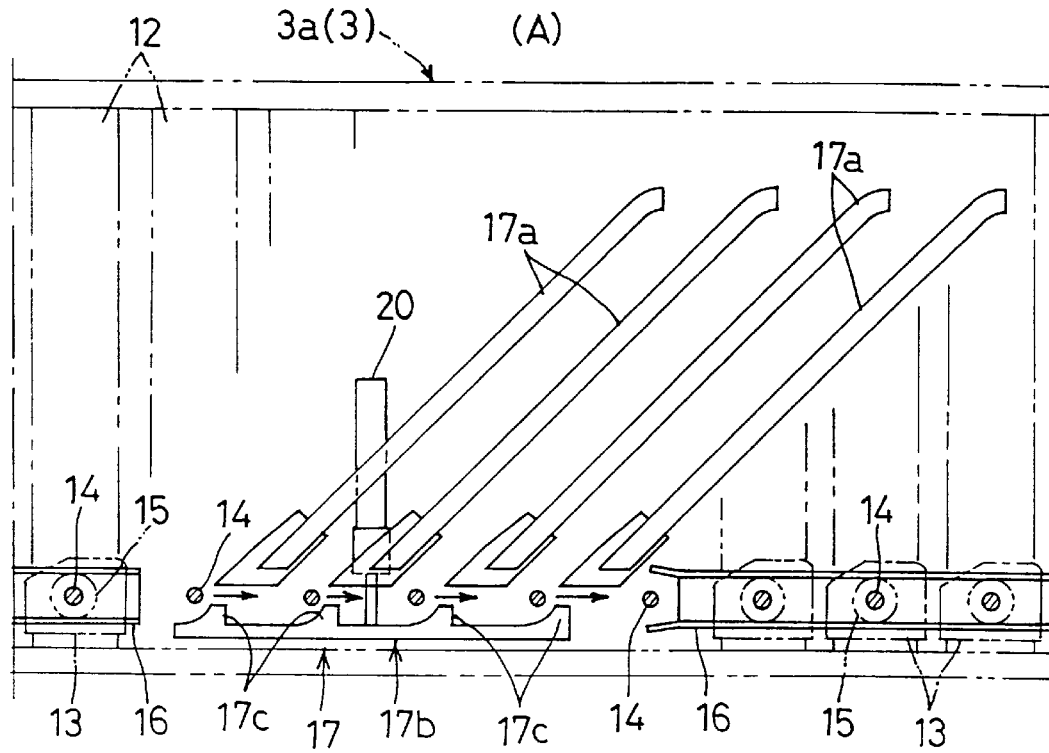
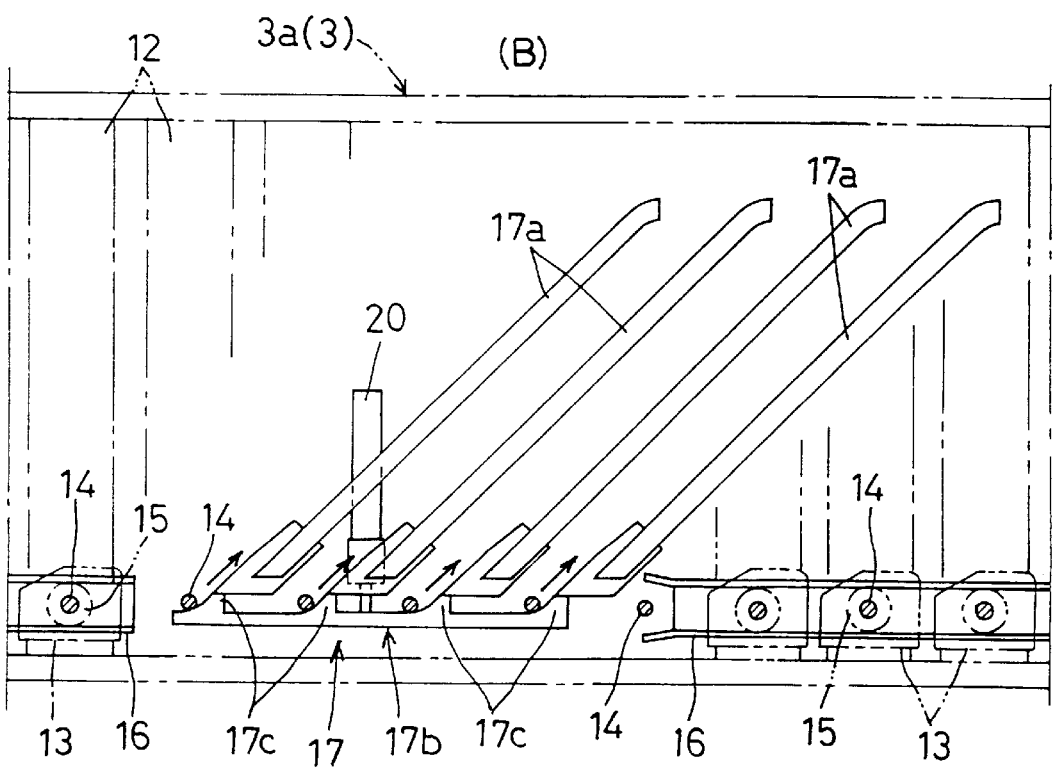

Fig. 8
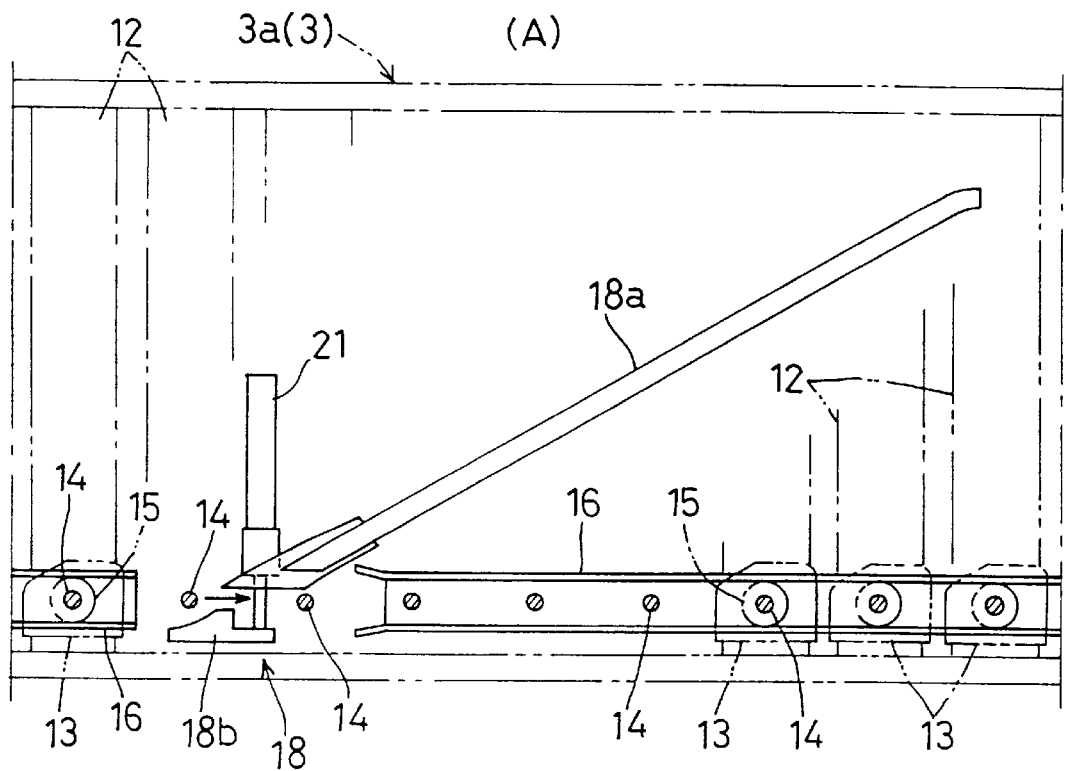
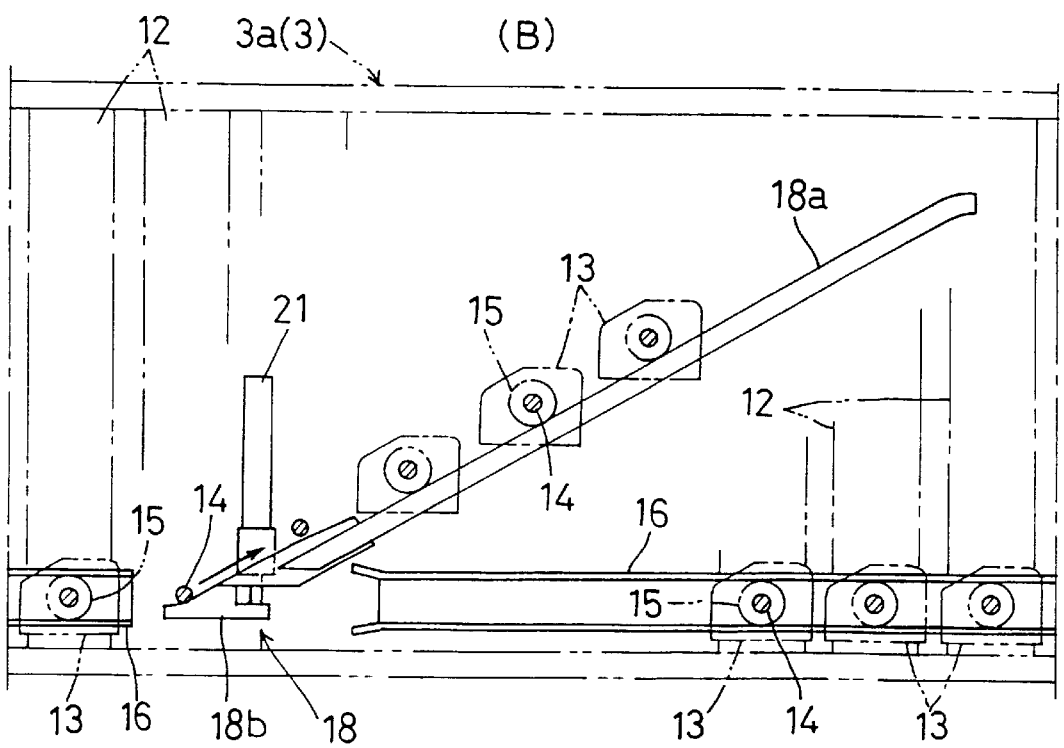

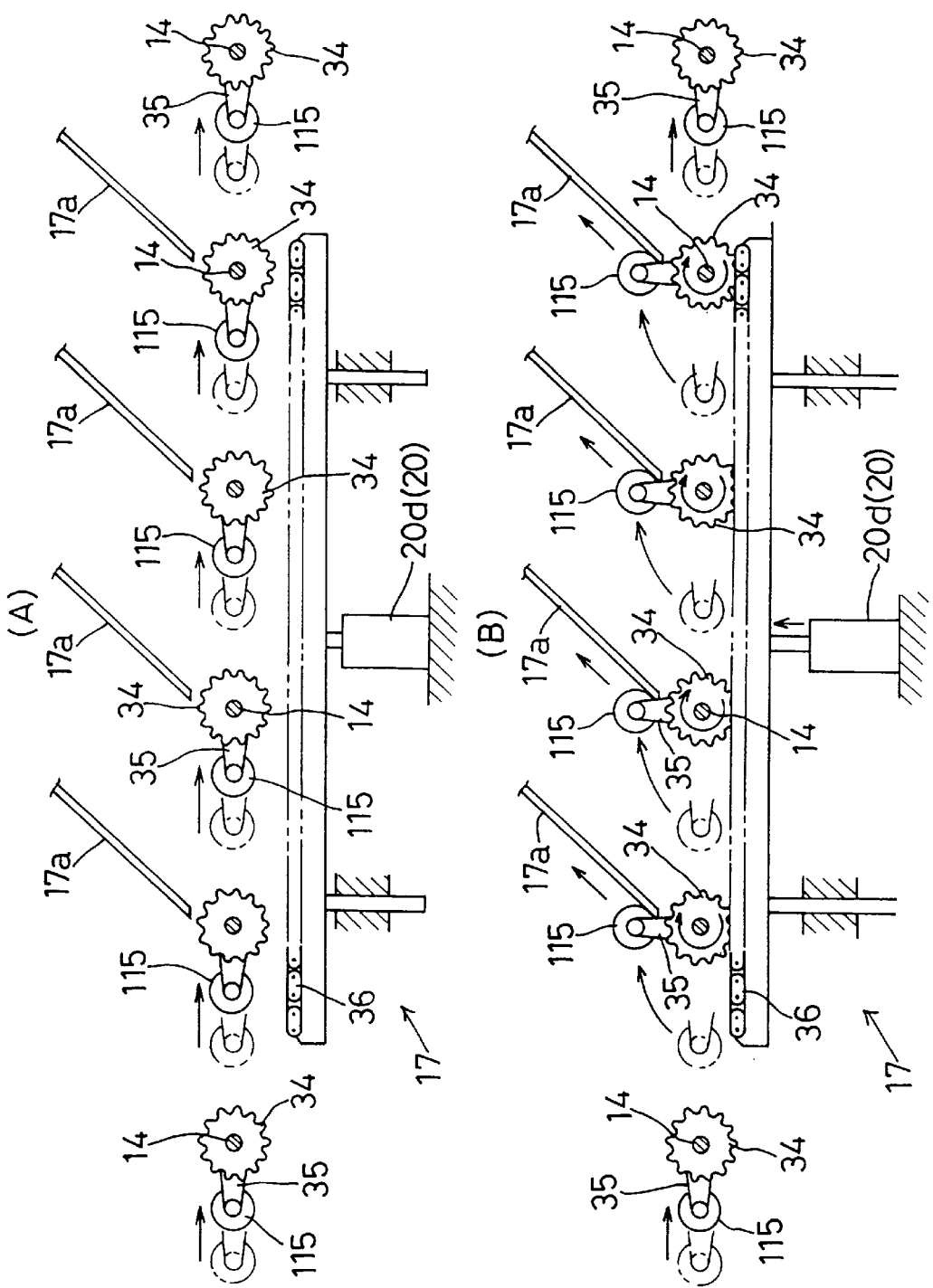

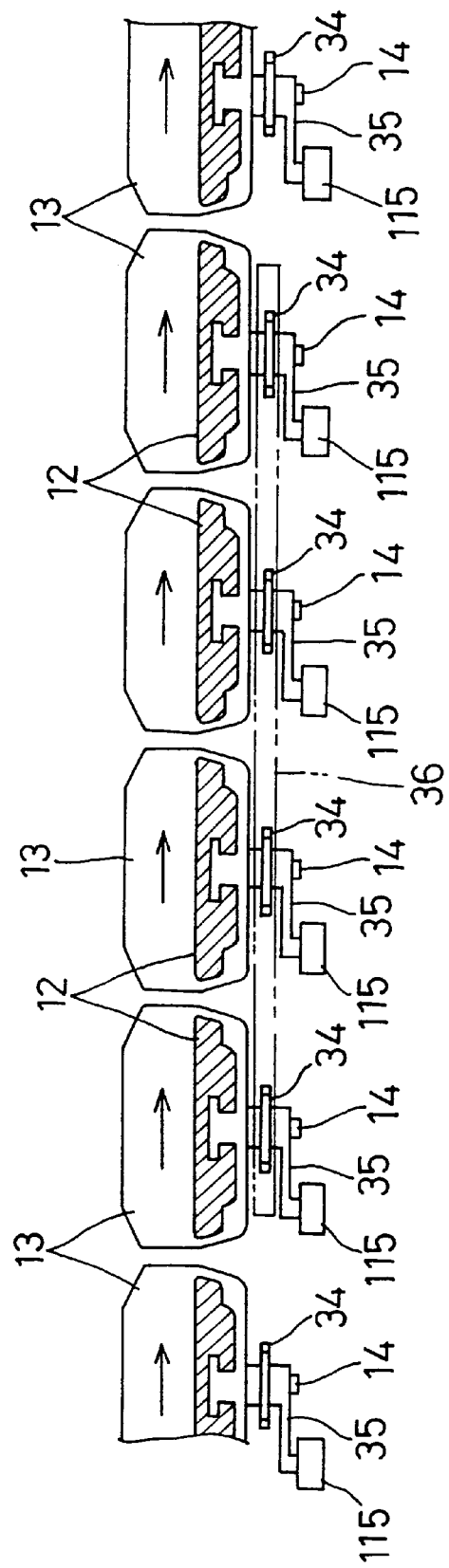

ORTHOGONAL TYPE BRANCHING CONVEYER FOR DIVERTING ARTICLES CARRIED BY A CONVEYER IN AN AUTOMATED WAREHOUSE

BACKGROUND OF THE INVENTION

1. Field of the Invention

The present invention relates to an automated warehouse, and relates more particularly to an automated warehouse including a plurality of article-storage apparatuses having a plurality of article-storage sections which are opened on a same side for allowing storage of articles respectively therein, a transfer apparatus movable along the open sides of the article-storage apparatuses for transferring an article between the storage apparatuses, a main conveyer for conveying the article, and a plurality of branching conveyers for conveying the article between the main conveyer and the transfer apparatus.

2. Description of the Related Art

With a known automated warehouse of the above-noted type, the main conveyer for carrying in the article comprises a roller conveyer having a number of rollers, and the carrying-in branching conveyers comprise chain conveyers having a rotatably driven chain.

That is, when an article conveyed by the carrying-in main roller conveyer has reached a location of a carrying-in branching conveyer corresponding to a target storage apparatus in which the article is to be stored, the conveying operation of the article by the carrying-in main roller conveyer is temporarily suspended and then the chain of the branching conveyer is rotatably driven to lift up this conveyer so as to scoop up the article on the main roller conveyer by this branching conveyer. This is a first type of automated warehouse.

A second type of automated warehouse is also known in which both the carrying-main main conveyer and the carrying-in branching conveyers comprise roller conveyers having a number of rollers, and further the branching conveyer branches the path of the article in the forward direction with diagonal inclination relative to the conveying direction of the carrying-in main roller conveyer.

However, with the first type of automated warehouse, for allowing transfer of each article from the main roller conveyer onto the branching chain conveyer, the conveying operation of the article y the main roller conveyer needs to be temporarily suspended. With such temporary suspension of the flow of articles, the article carrying-in operation takes a long time.

Also, with the second type of automated warehouse, after receiving the article from the carrying-in main roller conveyer, the branching roller conveyer needs to convey this article with gradually changing its direction. Accordingly, this construction results in elongation of the branching conveyer, so that a certain distance needs to be reserved between the main roller conveyer and the apparatus storage apparatus. As a result, the construction requires a large installment space.

SUMMARY OF THE INVENTION

The present invention attends to the above-described drawbacks of the prior art and its primary object is to provide an automated warehouse which allows smooth and uninterrupted flow of the articles being conveyed so as to reduce the time required for carrying-in or carrying-out operation of the article and which moreover allows reduction in the length of the branching conveyer to minimize the installment space.

For accomplishing the above-noted object, an automated warehouse, according to the present invention, comprises: a plurality of article-storage apparatuses having a plurality of article-storage sections for storing articles therein; a plurality of transfer apparatuses movable along the length of the article-storage apparatuses for transferring the articles between the respective article-storage sections; a main conveyer for transferring the articles; and a plurality of branching conveyers for conveying the articles between the main conveyer and the transfer apparatuses; wherein the main conveyer comprises a slat conveyer including a plurality of slats for conveying the articles mounted thereon and a plurality of pushing shoes movable along and together with the respective slats; and at least some of the plurality of branching conveyers comprises orthogonal type branching conveyers which extend substantially normal to the conveying direction of the main slat conveyer; and the automated warehouse further comprises switchover means for shifting a predetermined number of the pushing shoes toward the branching conveyer with aligning the shoes substantially straight along the conveying direction of the main slat conveyer.

With the automated warehouse having the above-described construction, the article of the main slat conveyer is transferred onto the branching conveyer by means of the pushing action of the pushing shoes provided on the main slat conveyer. Therefore, the article transfer operation from the main conveyer to the branching conveyer may take place smoothly without temporary suspension of the flow of the articles, so that the time required for the article carrying-in operation or the entire operation of the warehouse may be reduced. Further, as at least some of the plurality of branching conveyers are provided as the orthogonal type branching conveyers, these orthogonal branching conveyers may be formed short, thus reducing the installment space by an amount corresponding to the reduction of the length made possible.

Further and other functions and effects of the automated warehouse according to the present invention will become apparent from the following discussion of the preferred embodiments thereof with reference to the accompanying drawings.

BRIEF DESCRIPTION OF THE DRAWINGS

FIG. 6 is a plan view showing a guide rail of the slat conveyer, FIG. 8 is a plan view of the guide rail of the slat conveyer, FIG. 24 is a side view showing the switchover means of the embodiment shown in FIG. 23.

DETAILED DESCRIPTION OF THE PREFERRED EMBODIMENTS

Preferred embodiments of the present invention will now be described in details with reference to the accompanying drawings.

Figure 1:
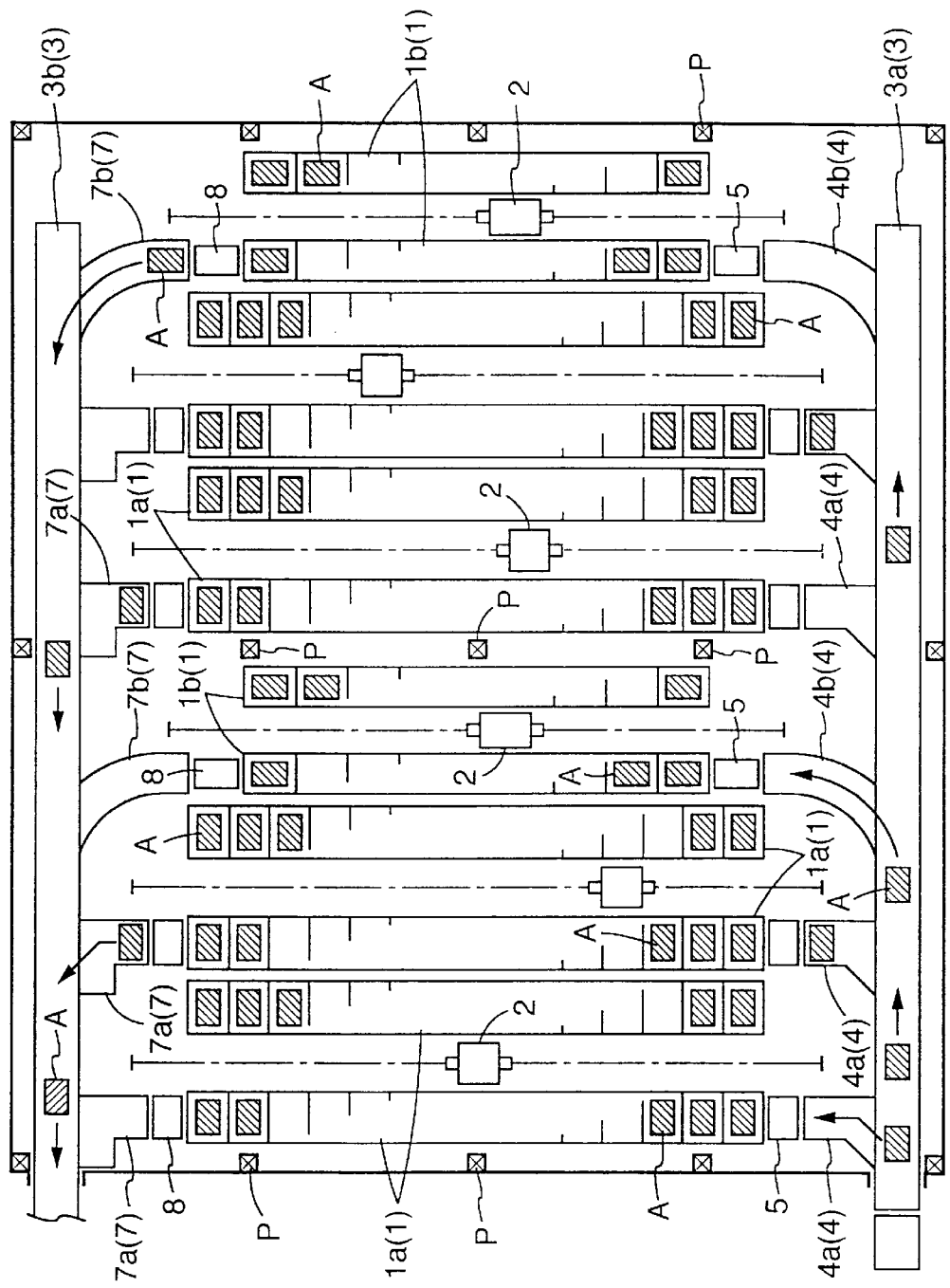
FIG. 1 is an overall plan view of an automated warehouse relating to a first embodiment of the present invention.

FIG. 1 shows an automated warehouse relating to a first embodiment of the present invention.

As shown in FIG. 1, this automated warehouse includes a plurality of article storage shelves 1 as article-storage apparatuses, each of the shelf including a plurality of storage sections for respectively storing articles therein. These article storage sections are arranged in the form of a matrix extending in a perpendicular direction and a longitudinal direction of the shelf. Further, all of the storage sections of each article storage shelf 1 have openings which are opened in a same direction. In the present specification, the side on which the openings of the respective article storing shelves 1 are opened will be referred to as an "entrance".

In this automated warehouse, a pair of article storage shelves 1 are disposed with the respective entrances thereof opposed to each other. And, a plurality of such pairs of article storage shelves 1 are disposed in parallel with each other. Between each paired article storage shelves 1, there is provided a stacker crane 2 which is movable along the entrances of these paired shelves 1.

Each stacker crane 2 includes a lift table having a projectable/retractable fork. In operation, with a horizontal self-travelling of the stacker crane 2, vertical movement of the lift table, and projecting/retracting movement of the fork, various kinds of articles A such as containers or corrugated boxes, may be transferred and carried in and out of the storage sections of the article storage shelves 1.

As shown in FIG. 1, along one longitudinal end of the respective article storage shelves 1 ("carry-in side" hereinafter), there is provided a carry-in slat conveyer 3a for carrying in the articles A. Further, a carry-in conveyer 4 is interposed between each article storage self 1 and the carry-in slat conveyer 3a. Adjacent a terminal end of this carry-in conveyer 4, a carry-in lifter 5 is provided for transferring the article to the stacker crane 2.

Figure 2:
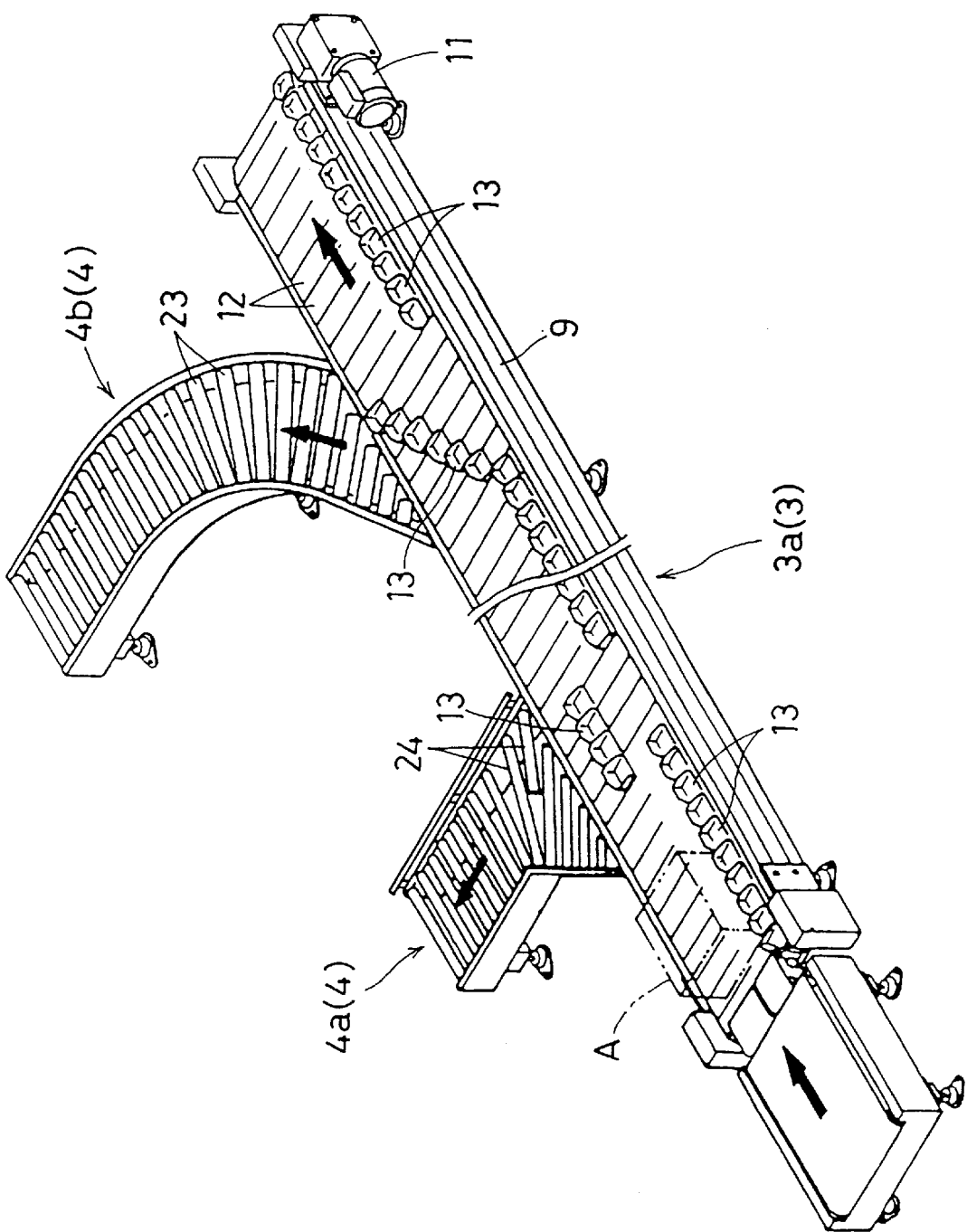
FIG. 2 is a perspective view of a carry-in slat conveyer and a carry-in conveyer.

As shown in FIG. 2, the carry-in conveyer 4 comes in two types of differing constructions. One of them is an orthogonal type carry-in conveyer 4a for transferring the article A in a direction substantially normal to the conveying direction of the carry-in slat conveyer 3a. For the purpose of the present specification and claims, "substantially normal" means the direction can deviate from the "normal" direction by 20 degrees although the deviation should preferably be within 10 degrees. The other is a diagonal type carry-in conveyer 4b for transferring the article A in a direction having a diagonal inclination relative to the conveying direction of the carry-in slat conveyer 3a.

Each article A has a rectangular shape in the plan view. For storing these rectangular articles A into the storage shelf 1, this is done generally in such a manner that the rectangular articles A will be arranged with the longitudinal sides thereof traversing the horizontal moving direction of stacker crane 2 (i.e. in the vertical orientation). Depending on e.g. the constructional constraints of the automated warehouse, however, it may sometimes be disadvantageous to orient all of the storage shelves 1 in the same direction for storing the articles A all in such vertical orientation.

In the case of this particular embodiment for example, as shown in FIG. 1, a plurality of pillars P are present in the middle of the warehouse construction. Hence, if all of the articles A were disposed with the vertical orientation, the presence of these pillars P would create un-utilized free space in the vicinity thereof, thus resulting in decrease in the number of storage shelves 1 that can be provided within the premises. For this reason, in the vicinity of each pillar P, a parallel pair of article storage shelves 1b of a different type are provided for storing the articles A with the longitudinal side thereof extending along the horizontal moving direction of the stacker crane 2 (i.e. in the lateral orientation). Between each pair of these article storage shelves 1b too, the stacker crane 2 is provided. For the same reason as above, a pair of the article storage shelves 1b of this type for storing the articles A with the lateral orientation are provided also in the vicinity of the right-hand wall of the construction.

In summary, the article storage shelves 1 consist of the two types, i.e. the shelves 1a for storing the articles A with the vertical orientation and the shelves 1b for storing the same with the lateral orientation. And, the carry-in conveyer for carrying in the article A to the former type of shelf 1a comprises the orthogonal type carry-in conveyer 4a for receiving the article A, which has been conveyed in the vertical orientation from the carry-in slat conveyer 3a, and conveying this article as it is toward the shelf 1a without changing its orientation, i.e. in the lateral orientation relative to this conveyer 4a.

On the other hand, the carry-in conveyer for conveying the articles A to the latter type of shelf 1b comprises the diagonal type carry-in conveyer 4b for receiving the article A which has been conveyed with the vertical orientation from the carry-in slat conveyer 3a and conveying this article toward the self 1b with gradually changing its orientation into the vertical orientation.

On the opposite side of the carry-in side, i.e. on the carry-out side of each article storage shelf 1, there is provided a carry-out slat conveyer 3b for carrying out the article A from the shelf. Between each article storage self 1 and this carry-out slat conveyer 3b, there is provided a carry-out conveyer 7; and at the conveyance-starting end of each carry-out conveyer 7, a carry-out lifter 8 is provided for transferring the article A from the stacker crane 2.

Figure 3:
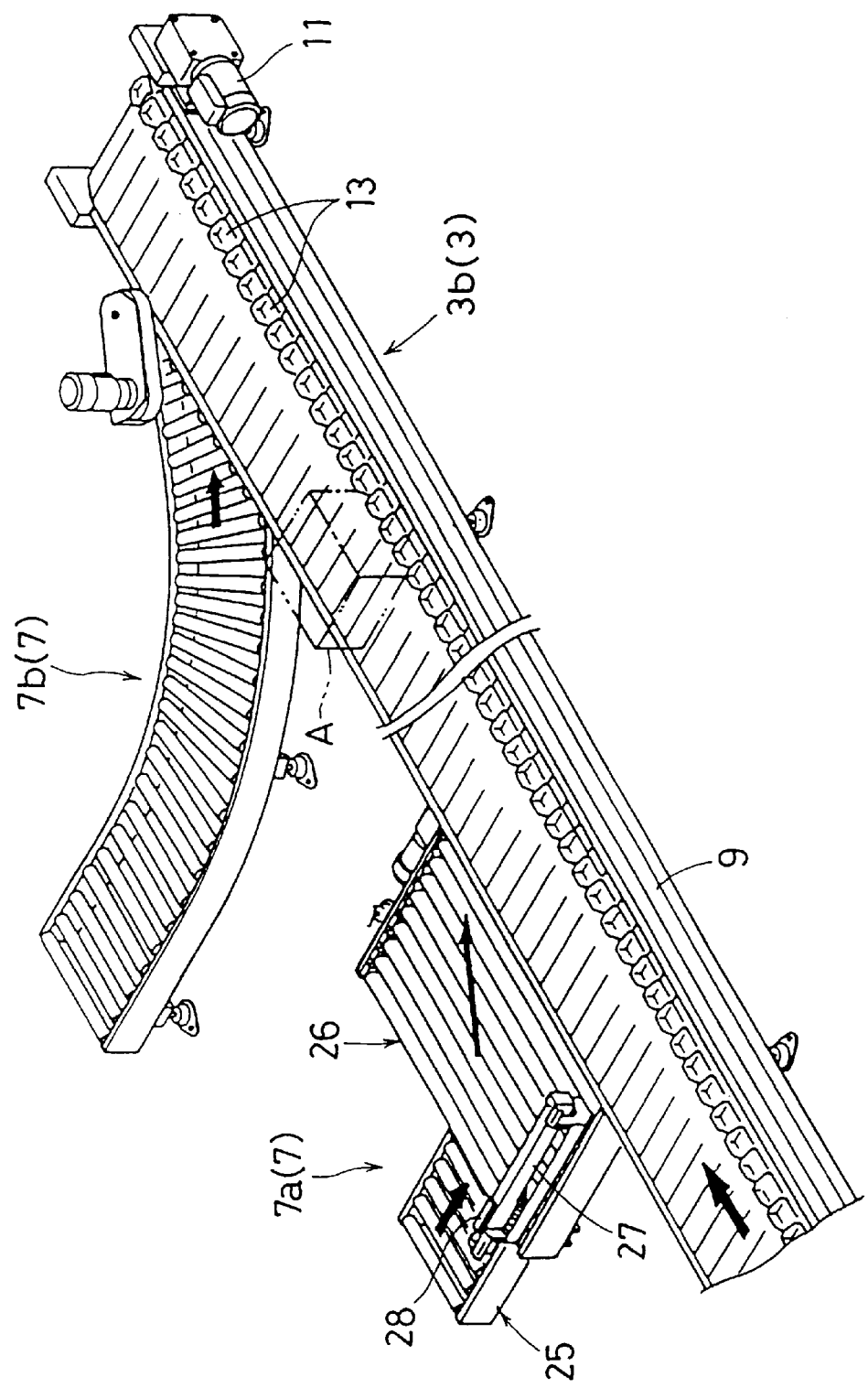
FIG. 3 is a perspective view of a carry-out slat conveyer and a carry-out conveyer.

Like the carry-in conveyer 4 described hereinbefore, as shown in FIG. 3, the carry-out conveyer 7 comes in two types of differing constructions. One of them is an orthogonal type carry-out conveyer 7a for conveying the article A in a direction substantially normal to the conveying direction of the carry-out slat conveyer with maintaining the lateral orientation of the article A. This type of carry-out conveyer 7a is provided for each of the article storage shelves 1a which store the articles A in the vertical orientation. The other is a diagonal type carry-out conveyer 7b for transferring the article A in a direction having a diagonal inclination relative to the conveying direction of the carry-out slat conveyer 3b, with gradually changing the orientation of the article A toward the vertical orientation relative to the carry-out slat conveyer 6. This latter type of carry-out conveyer 7b is provided for each of the other type of storage shelves 1b which store the articles A in the lateral orientation.

The carry-in slat conveyer 3a and the carry-out slat conveyer 3b are identical in the construction.

Figure 4:
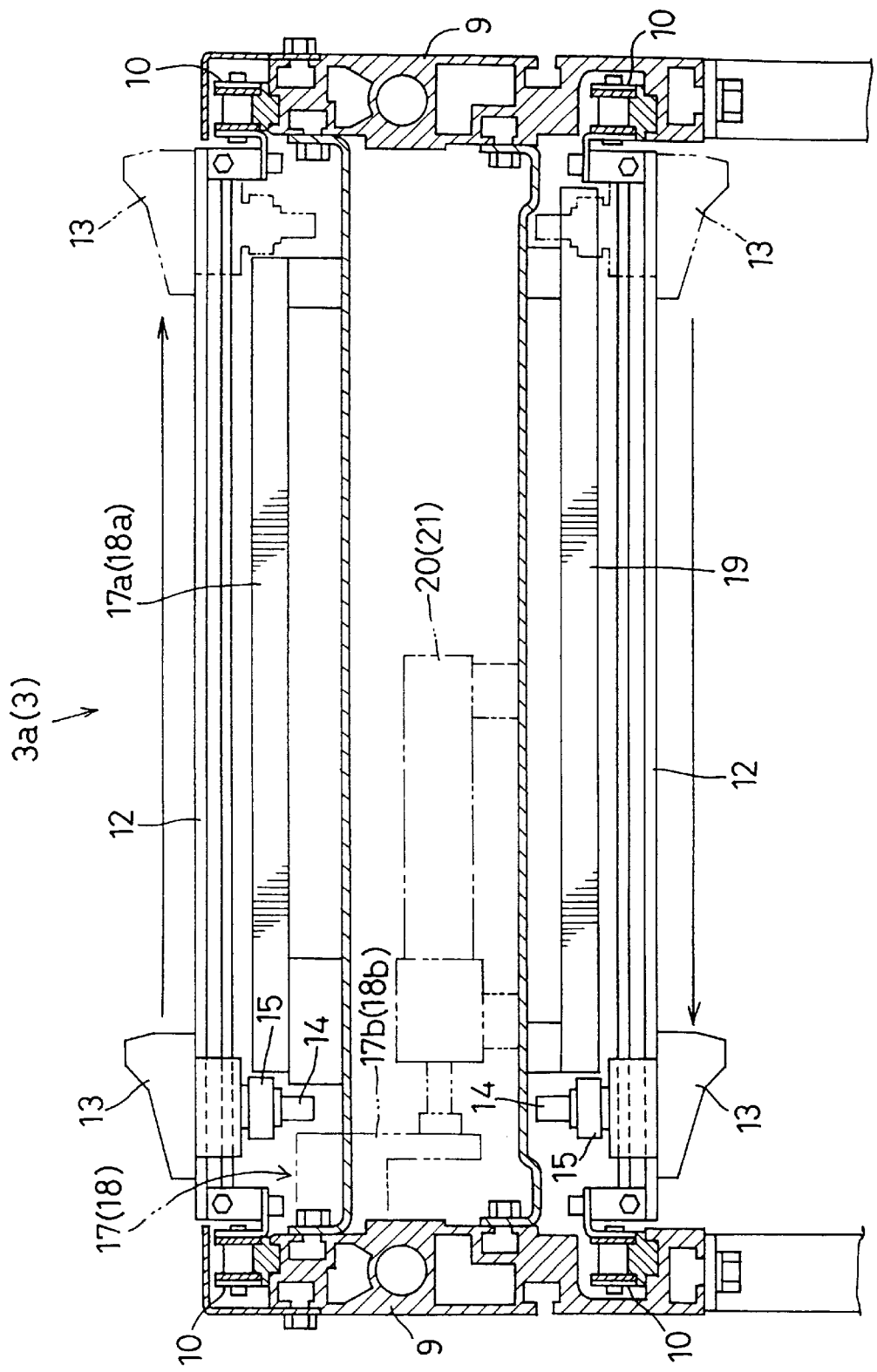
FIG. 4 is a section view of the slat conveyer.
Figure 5:
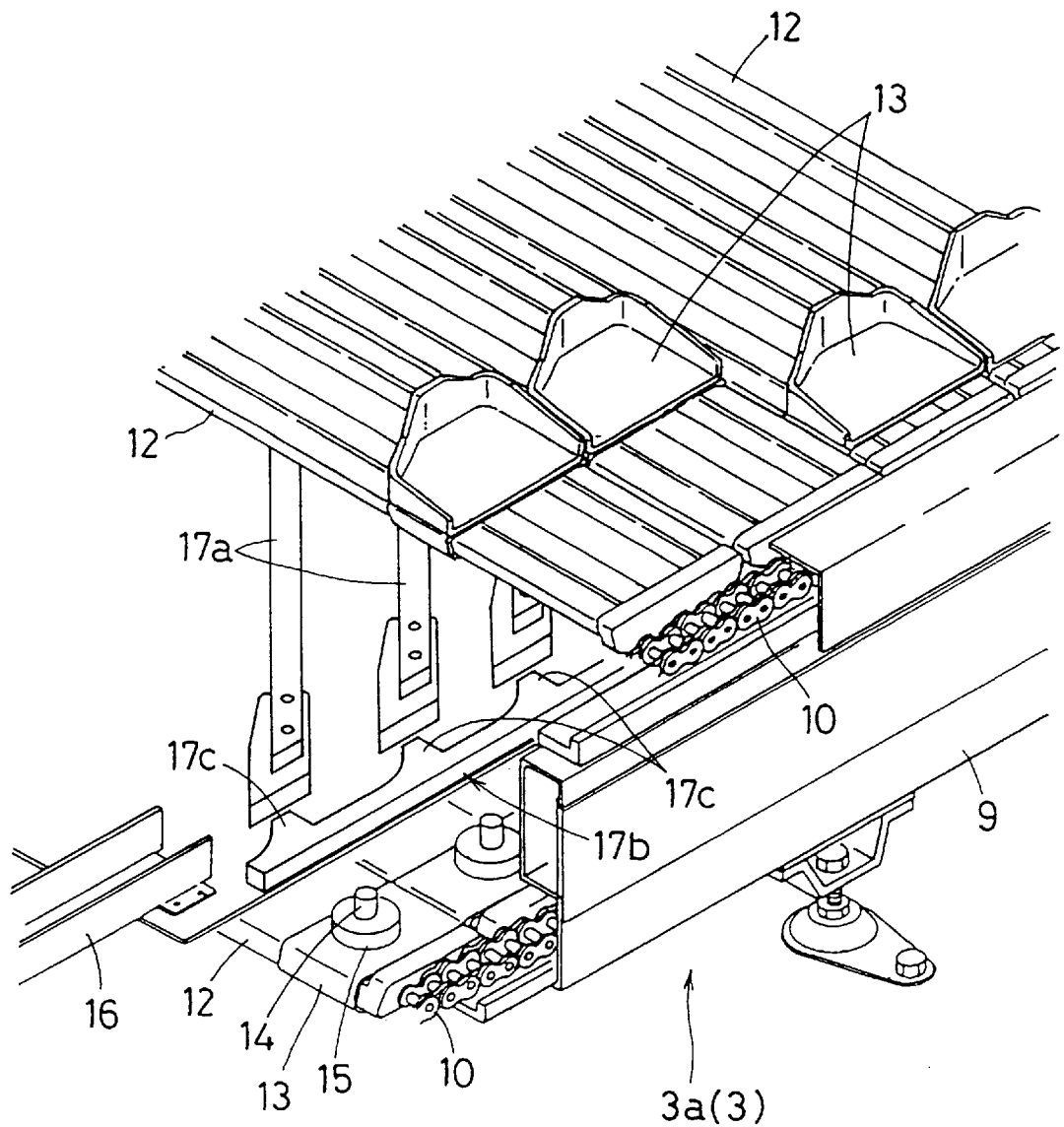
FIG. 5 is a partially cutaway perspective view of the slat conveyer.

As shown in FIGS. 4 and 5, a pair of frames 9 are provided on the right and left sides relative to the conveying direction. At opposed longitudinal ends of each frame 9,unillustrated drive and driven or free sprockets are provided respectively. On these paired sprockets of the opposed sides, there are entrained a pair of right and left endless chains 10. As the drive sprockets are driven by means of an electric motor 11, the right and left chains 10 are driven to rotate, so that the chains are rotated in the same direction as the conveying direction on the upper side of the frames 9 whereas the chains are rotated in the reverse direction on the lower side of the frames 9.

Figure 7:
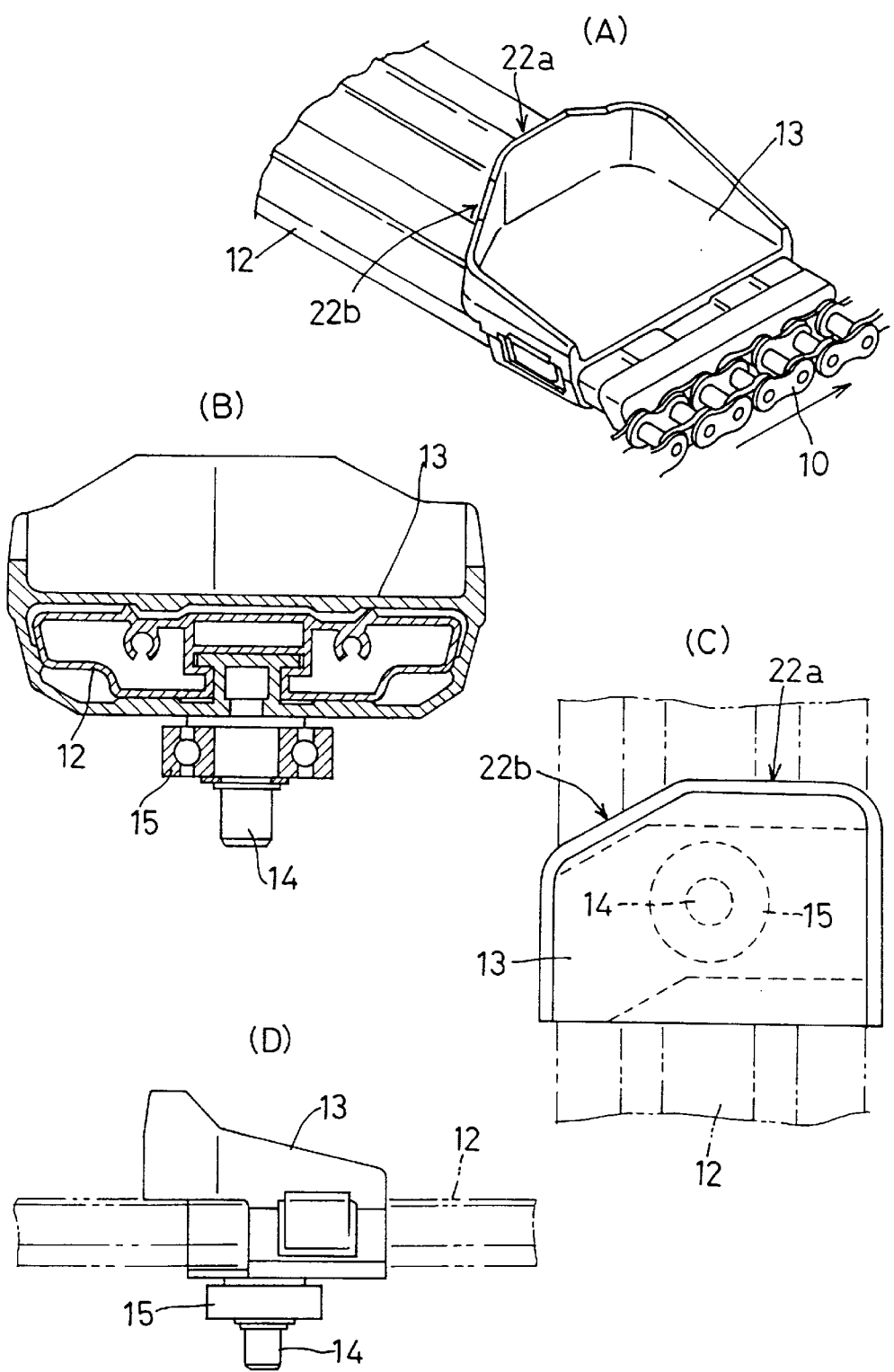
FIGS. 7(A)–(D) show pushing shoes movable relative to the slat conveyer.

Between the right and left chains 10, there are mounted a plurality of long and narrow slats 12. The slats 12 are movable together with the chains 10. Further, each slat 12 mounts a pushing shoe 13 movable along the length of and together with the slat 12 for pushing the article A toward the carry-in conveyer 4. Namely, each pushing shoe 13 is slidable along the length of the slat 12 corresponding thereto. As may be seen in FIG. 7(B) or 7(D), each pushing shoe 13 includes, at the bottom end thereof, a pin 14 as a guided member, on which a guide wheel 15 is mounted rotatably about the axis of the pin 14. The lower end of the pin 14 extends downward beyond the guide roller 15.

As shown in FIGS. 6 and 8, on the inner side of the right and left frames 9 opposed to each other, there are provided a pair of right and left main guides 16 disposed respectively along the right and left chains 10 for guiding the guide wheels 15 of the respective pushing shoes 13. More particularly, the right-hand main guide 16 has a portion extending along the upper run of the right-hand chain 10 and a further portion extending along the lower run of the same. Similarly, the left-hand main guide 16 has a portion extending along the upper run of the left-hand chain 10 and a further portion extending along the lower run of the same.

As shown in FIG. 6, on the right and upper side, relative to the conveying direction, of the right and left main guides 16, there are provided a plurality of orthogonal branching guides 17a in correspondence in position to the respective orthogonal type carry-in conveyers 4a and interconnecting the right and left upper main guides 16. Each of these orthogonal branching guides 17a includes a guide face for coming into operative contact with the pushing shoe.

The plurality of orthogonal branching guides 17a are disposed, along the conveying direction of the slat conveyer 6, with a substantially same inter-distance therebetween as the inter-distance between the slats 12 adjacent each other.

Further, as shown in FIG. 8, at a position corresponding to each diagonal type carry-in conveyer 4b, there is provided a single diagonal branching guide 18a interconnecting the opposed main guides 15 in the diagonal direction. Further, for the lower runs of the main guide 16, there is provided a return guide 19 (see FIG. 4) diagonally connecting the right and left main guides 16 with each other. Accordingly, of the right and left main guides 16, one extends along the entire length of the endless chain 10 and the other extends along the upper run of the chain 10 and is terminated at this return guide 19.

Adjacent the orthogonal branching guides 17a, there is provided an orthogonal turning member 17b having a plurality of turning elements 17c including inclined guide faces 17d for coming into contact with the pins 14 thus turning the plurality of guide wheels 15, which have been guided by the main guides 16, toward the orthogonal branching guides 17a at one time. A plurality of these orthogonal turning members 17b are provided in correspondence with the orthogonal branching guides 17a and fixed thereto respectively. Each orthogonal turning member 17b is projectable and retractable by means of an orthogonal-branching air cylinder 20. The orthogonal branching guides 17a, and the orthogonal turning members 17b together constitute an orthogonal-branching switchover means 17 for switching the plurality of pushing shoes 13 over to align them in a straight line extending along the conveying direction of the carry-in slat conveyer 3a.

Accordingly, the orthogonal switchover means 7 is displaceable, by means of the orthogonal-branching air cylinder 20, between an operative position in which the means comes into contact with the pushing shoe 13 for guiding the same and an inoperative position in which the means does not come into contact with the pushing shoe 13.

Similarly, adjacent the diagonal branching guide 18a, there is provided a diagonal branching member 18b projectable and retractable by means of a diagonal-branching air cylinder 21 for turning one after another the plurality of guide wheels 15, which have been guided by the main guide 16, toward the diagonal branching guide 18. The diagonal branching guide 18a and the diagonal turning member 18b together constitute a diagonal-branching switchover means 18 for switching the plurality of pushing shoes 13 one after another over to align them in a direction extending diagonally relative to the conveying direction of the carry-in slat conveyer 3a.

With the above-described constructions of the carry-in slat conveyer 3a and carry-out slat conveyer 3b, when the right and left chains 10 are rotatably driven by the respective drive sprockets, the respective slats 12 and the pushing shoes 13 mounted thereon too will be driven to rotate together with the chains 10 so as to convey the article A placed on the slats 12.

Figure 9:
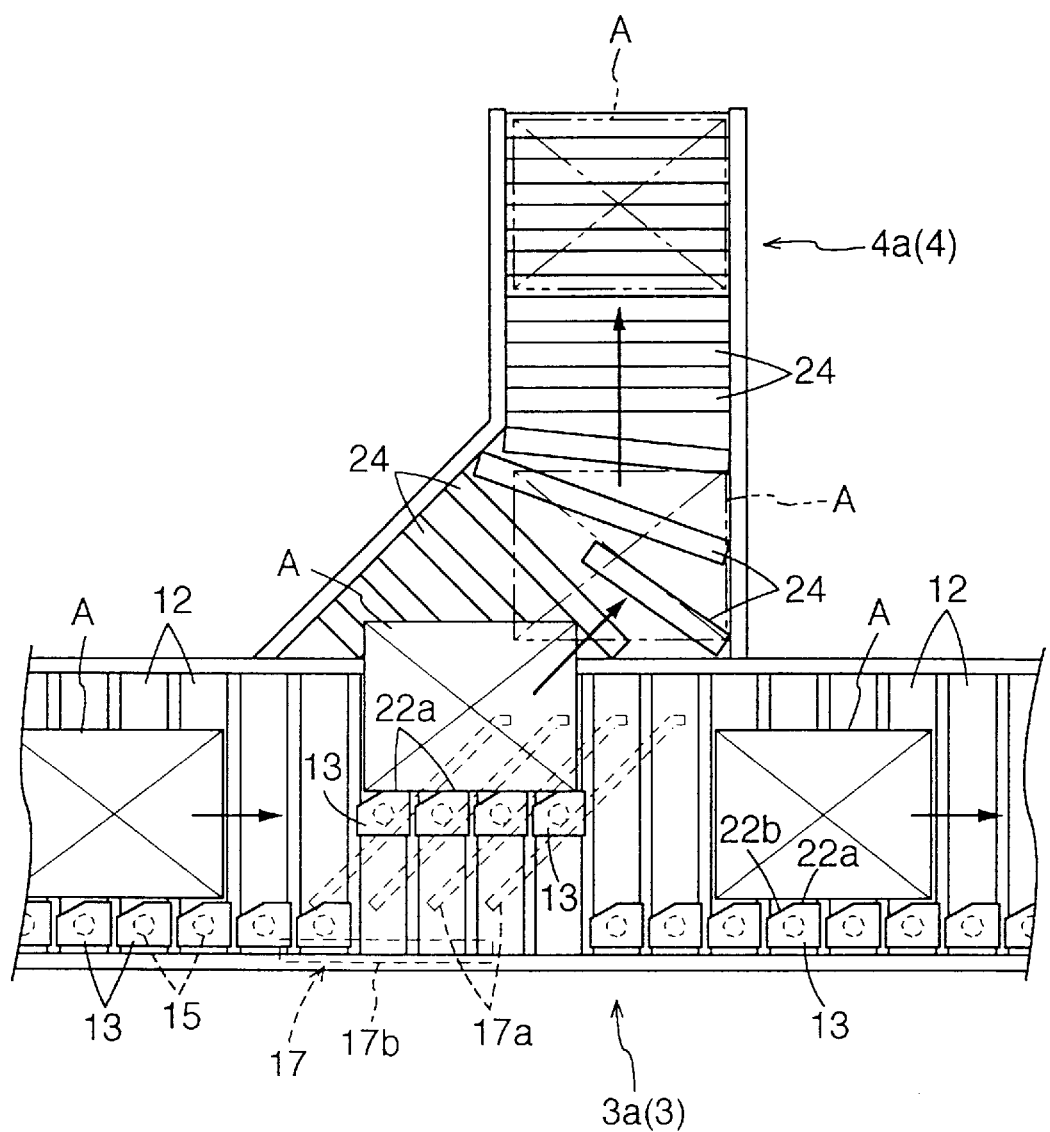
FIG. 9 is a plan view of the carry-in slat conveyer and the carry-in conveyer.

For transferring the article A onto the orthogonal type carry-in conveyer 4a, as shown in FIG. 6(B), the orthogonal turning member 17b is driven by the orthogonal-branching air cylinder 20 to be projected toward the main guide 16. With this, the pins 14 supporting the plurality of guide wheels 15 which have been moved along the main guide 16 come into abutment against the respective turning elements 17c to be guided thereby, so that the plurality of guide wheels 15 will be turned at one time in direction toward the respective orthogonal branching guides 17a. When the plurality of pushing shoes 13 are aligned straight along the conveying direction of the slat conveyers 3a, 3b as shown in FIG. 9 by means of the movement of each slat 12 toward the conveying direction and also the guiding function of the orthogonal branching guides 17a for the respective guide wheels 15, the article A is pushed to be transferred onto the orthogonal type carry-in conveyer 4a.

Figure 10:
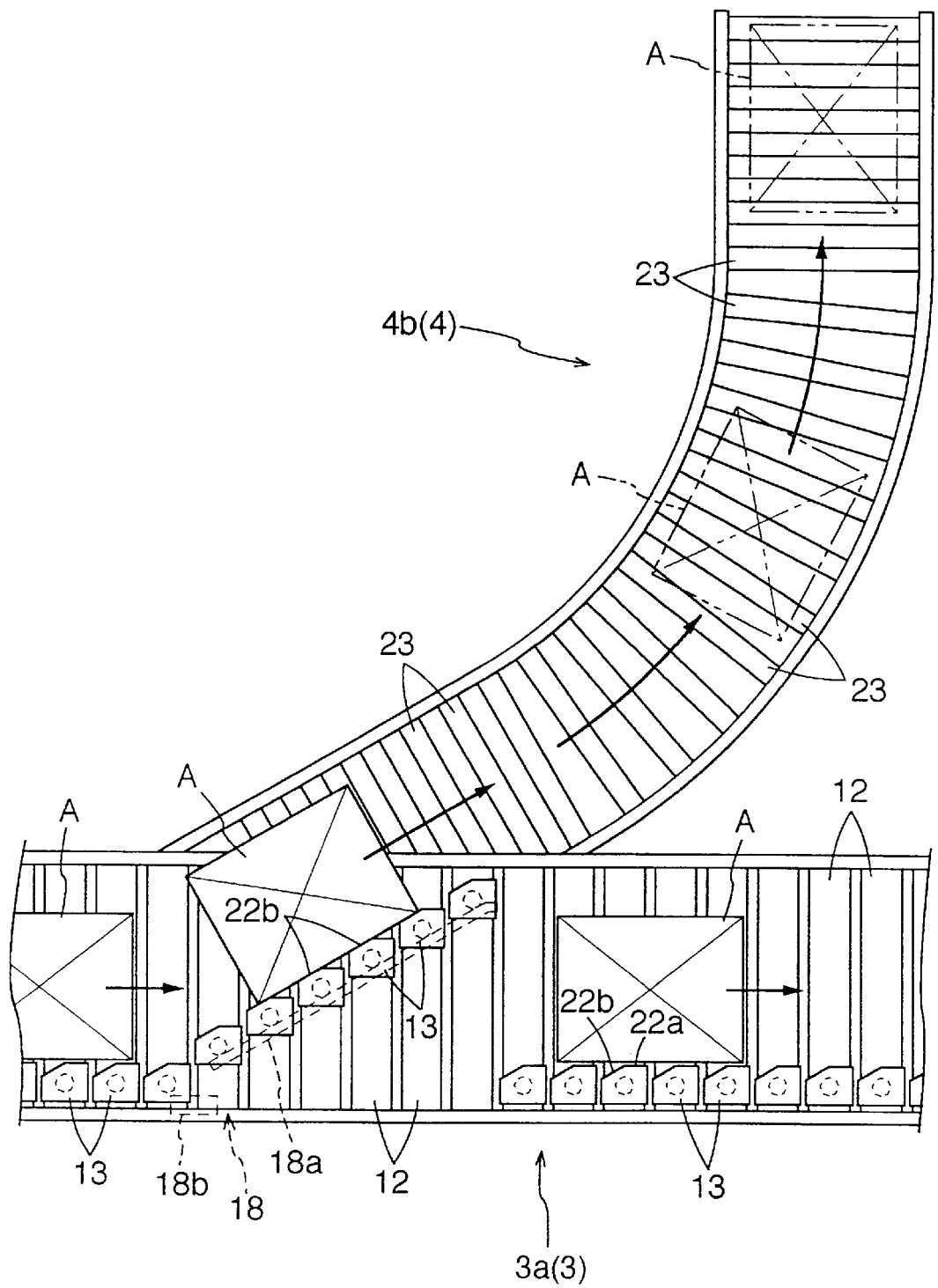
FIG. 10 is a plan view of the carry-in slat conveyer and the carry-in conveyer.

For transferring the article A onto the diagonal type carry-in conveyer 4b, as shown in FIG. 8(B), the diagonal turning member 18b is driven by the diagonal-branching air cylinder 21 to be projected toward the main guide 16. With this, the pins 14 supporting the plurality of guide wheels 15 which have been moved along the main guide 16 come into abutment against the diagonal turning member 18b to be guided thereby, so that they will be turned one after another toward the diagonal branching guide 18a. With the movement of each slat 12 toward the conveying direction and the guiding function of the diagonal branching guide 18a on the respective guide wheels 15, as shown in FIG. 10 the plurality of pushing shoes 13 will push and branch the article A in the direction diagonally traversing the conveying direction of the slat conveyers 3a, 3b so as to transfer the article A onto the diagonal type carry-in conveyer 4b. After the transfer operation onto the orthogonal type carry-in conveyer 4a or the diagonal type carry-in conveyer 4b, the pushing shoes 13 will be returned by the return guide 19 toward the original main guide 16.

As described above, as each pushing shoe 13 is to serve for the transfer operation onto both the orthogonal type carry-in conveyer 4a and the diagonal type carry-in conveyer 4b, each shoe 13 includes an orthogonal-branching pushing face 22a serving for the transfer to the orthogonal type carry-in conveyer 4a and also a diagonal-branching pushing face 22b serving for the transfer to the diagonal type carry-in conveyer 4b.

The orthogonal carry-in conveyer 4a, diagonal carry-in conveyer 4b, and the diagonal carry-out conveyer 7b all comprise roller conveyers having a plurality of rollers all of which are rotatable. The diagonal carry-in conveyer 4b and the diagonal carry-out conveyer 7b are identical in construction, different only in the conveying directions. In these conveyers 4b, 7b, as shown in FIG. 10, a plurality of diagonal-branching rollers 23 of differing lengths are arranged along a curved path with gradually changing in direction. Further, these diagonal-branching rollers 23 are adapted to be rotatably driven in synchronism with each other by means of an unillustrated electric motor.

On the other hand, in the case of the orthogonal carry-in conveyer 4a, as shown in FIG. 9, a plurality of orthogonal-branching rollers 24 thereof of differing lengths are arranged along an angular path with sharply changing in direction. These orthogonal-branching rollers 24 too are adapted to be rotatably driven in synchronism with each other by means of an unillustrated electric motor.

Figure 11:
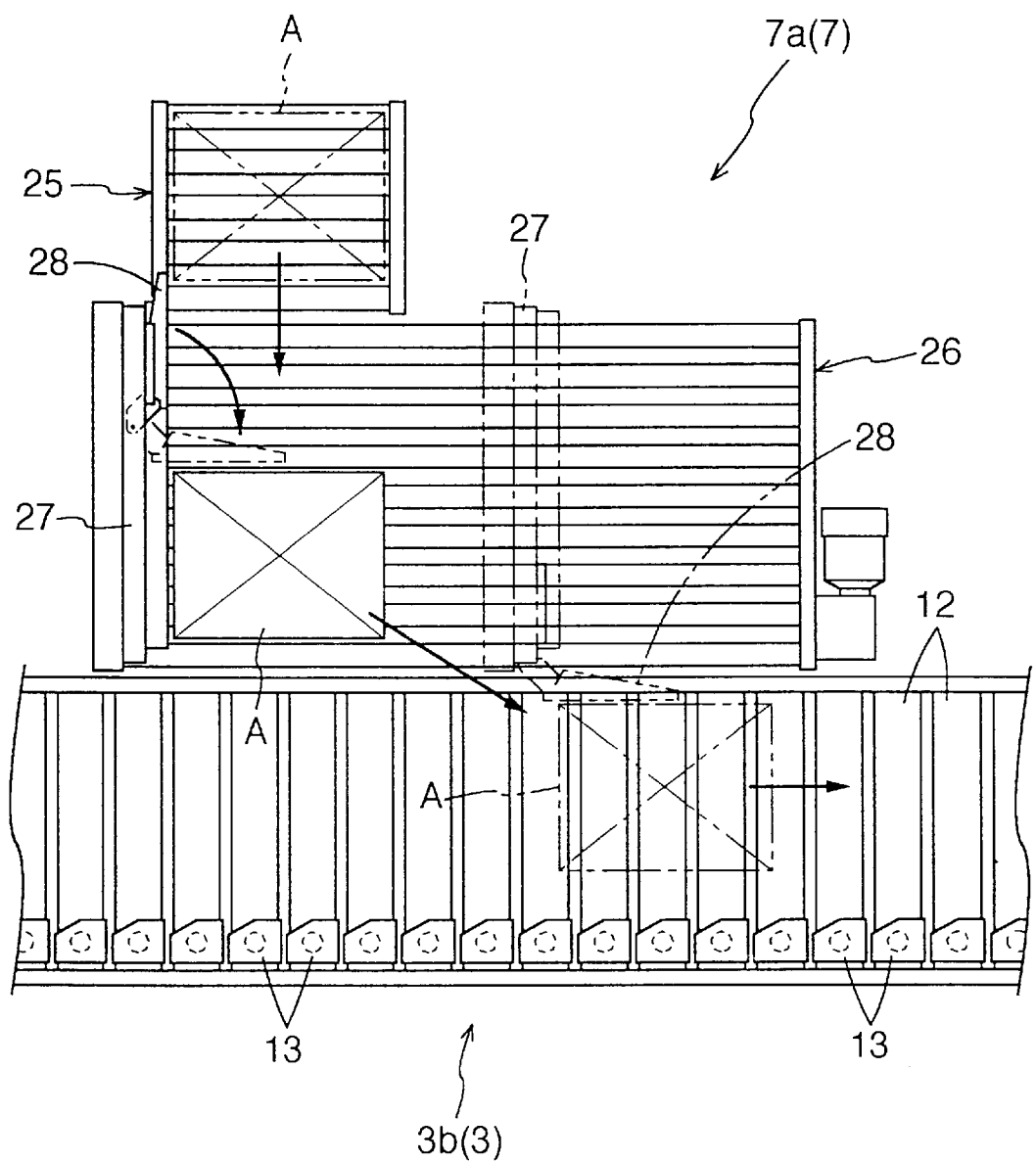
FIG. 11 is a plan view of the carry-out slat conveyer and the carry-out conveyer.

In the case of the orthogonal carry-out conveyer 7a, as shown in FIG. 11, this conveyer includes a first roller conveyer 25 having a plurality of rotatably driven rollers 25 and a second roller conveyer 26 having a plurality of freely rotatably rollers. The second roller conveyer 26 includes a laterally elongate pusher member 27 for pushing the article A, and this pusher member 27 pivotably mounts a pusher element 28, which in its projected posture moves along the length of the pusher member 27 for pushing the article A.

In operation, when the article A is conveyed from the first roller conveyer 25, the pusher member 27 is moved along the conveying direction of the carry-out slat conveyer 3b, and the pusher element 28 in its projected posture is moved along this pusher member 27 toward the carry-out slat conveyer 3b. Accordingly, as indicated by arrows in FIG. 11, the article A will be moved diagonally across the second roller conveyer 26 and at a speed synchronized with the conveying speed of the carry-out slat conveyer 3b so as to be transferred onto this carry-out slat conveyer 3b.

The above-described operations of the automated warehouse having the aforesaid construction are all controlled by a control device H acting as a controlling means using a microcomputer.

Figure 12:
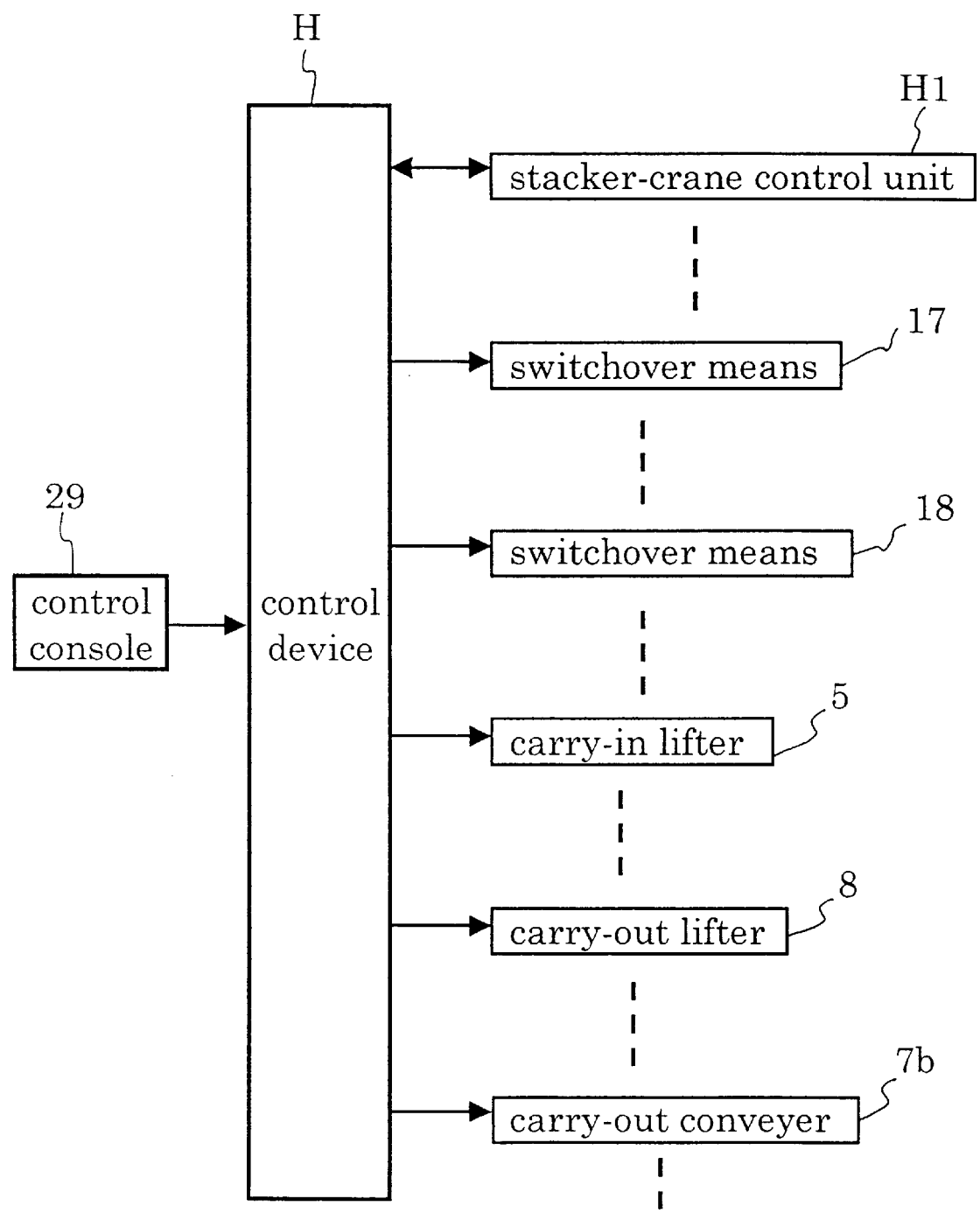
FIG. 12 is a schematic block diagram of a control device.

This control device H, as shown in FIG. 12, is capable of communicating with a stacker-crane control unit H1 for controlling the respective stacker cranes 2. The control device H controls e.g. the orthogonal-branching switchover means 17 or the diagonal-branching switchover means 18 by controlling the orthogonal-branching air cylinder 20 or the diagonal-branching air cylinder 21 for the respective slat conveyers 3a, 3b, based on an instruction from a control console 29.

Next, the control operations of the automated warehouse by the control device H will be described.

For carrying in the article A, information pertinent to this article A to be carried in will be inputted to the control console 29. Based on this inputted information, the control device H will specify one particular article storage shelf 1 and its storage section into which the article A is to be carried.

When the article A having been conveyed by the carry-in slat conveyer 3a has reached a predetermined position relative to one particular carry-in conveyer 4 corresponding to the target storage shelf 1, this is detected by the unillustrated article-presence detecting means, which outputs a detection signal. Then, based on this signal, the switchover means 17 or 18 is activated.

More particularly, in the above process, if the particular carry-in conveyer 4 is the orthogonal type carry-in conveyer 4a, the orthogonal-branching air cylinder 20 will be actuated to cause the orthogonal-branching turning member 17b to be projected toward the main guide 16. With this, the guide wheels 15 of a predetermined number of pushing shoes 13 will be turned in direction from the main guide 16 toward the orthogonal branching guides 17a, and these predetermined number of pushing shoes 13 as aligned along the conveying direction of the carry-in slat conveyer 3a will push the article A for transferring it onto the orthogonal carry-in conveyer 4a.

On the other hand, if the particular carry-in conveyer 4 is the diagonal type carry-in conveyer 4b, the diagonal-branching air cylinder 21 will be actuated to cause the diagonal-branching turning members 18b to be projected toward the main guide 16, so as to move the predetermined number of pushing shoes 13 one after another along the direction diagonally traversing the conveying direction of the carry-in slat conveyer 3a, thus pushing the article A to be transferred onto the diagonal type carry-in conveyer 4b.

When the article A has arrived on the carry-in lifter 5, this is detected by the unillustrated article-presence detecting means, which then outputs a detection signal. Then, based on this detection signal, the carry-in lifter 5 will be lifted up, and the article A will be scooped up by the fork of the stacker crane 2.

Thereafter, the fork of the stacker crane 2 will be retracted to transfer the article A onto the lift table of the stacker crane 2; and with the self-traveling of the stacker crane 2, vertical movement of the lift table, and projecting and retracting movements of the fork, the article A will be put into the specified storage section of the article storage shelf 1. In this, if this particular article storage shelf 1 is the vertical type 1a for storing the articles in the vertical orientation, the article A will be stored with the vertical orientation. If, on the other hand, the particular shelf 1 is the lateral type 1b for storing articles in the lateral orientation, the article A will be stored with the lateral orientation. This completes the transfer operation of the article A.

For carrying out an article A, the information pertinent to this article A to be carried out is inputted to the control console 47. Then, based on this inputted information, the control device H will specify the one particular article storage shelf 1 and its storage section in which this article A is stored.

Then, in the reverse manner from the above-described sequence for a carry-in operation, the stacker crane 2 carries the article A from the specified storage section of the storage shelf 1 and transfers it onto the carry-out lifter 8. Thereafter, the carry-out lifter 8 is lowered to transfer the article onto the carry-out conveyer 7.

In the above, if this carry-out conveyer 7 is the orthogonal type carry-out conveyer 7a, based on a signal from an unillustrated article-presence detecting means provided on the second roller conveyer 26, the pusher member 27 and the pusher element 28 will be actuated to carry out the article A on to the carry-out slat conveyer 3b at a speed synchronized with the conveying speed of this carry-out slat conveyer 3b.

If the carry-out conveyer 7 is the diagonal type carry-out conveyer 7b, the article A will be carried out with gradual change in its orientation onto the carry-out slat conveyer 3b. In either case above, each article A will be carried out onto the carry-out slat conveyer 7b with the vertical orientation relative thereto. Thereafter, with switching over operation of the orthogonal-branching switchover means 17 or the diagonal-branching switchover means 18 provided on the carry-out slat conveyer 3b, the article A will be carried out to a predetermined location, thereby completing the carry-out operation.

[Other embodiments]

(1) In the automated warehouse relating to the first embodiment described above, with the plurality of article storage shelves 1 disposed therebetween, the carry-in slat conveyer 3a is disposed on one side thereof, i.e. on the carry-in side, and the carry-out slat conveyer 3b is disposed on the other side thereof, i.e. on the carry-out side. However, various modifications are possible in the specific layout and construction of this automated warehouse.

Next, there will be described some of such modified embodiments, in which, it is to be noted, like components as the first embodiment will be denoted with like reference marks or numerals, and will not be described in repetition. Incidentally, as for the main conveyer 3, the following modified embodiments employ main conveyers of the identical construction, but these will be noted with different marks, such as 3c, 3d, in the respective embodiments.

Figure 13:
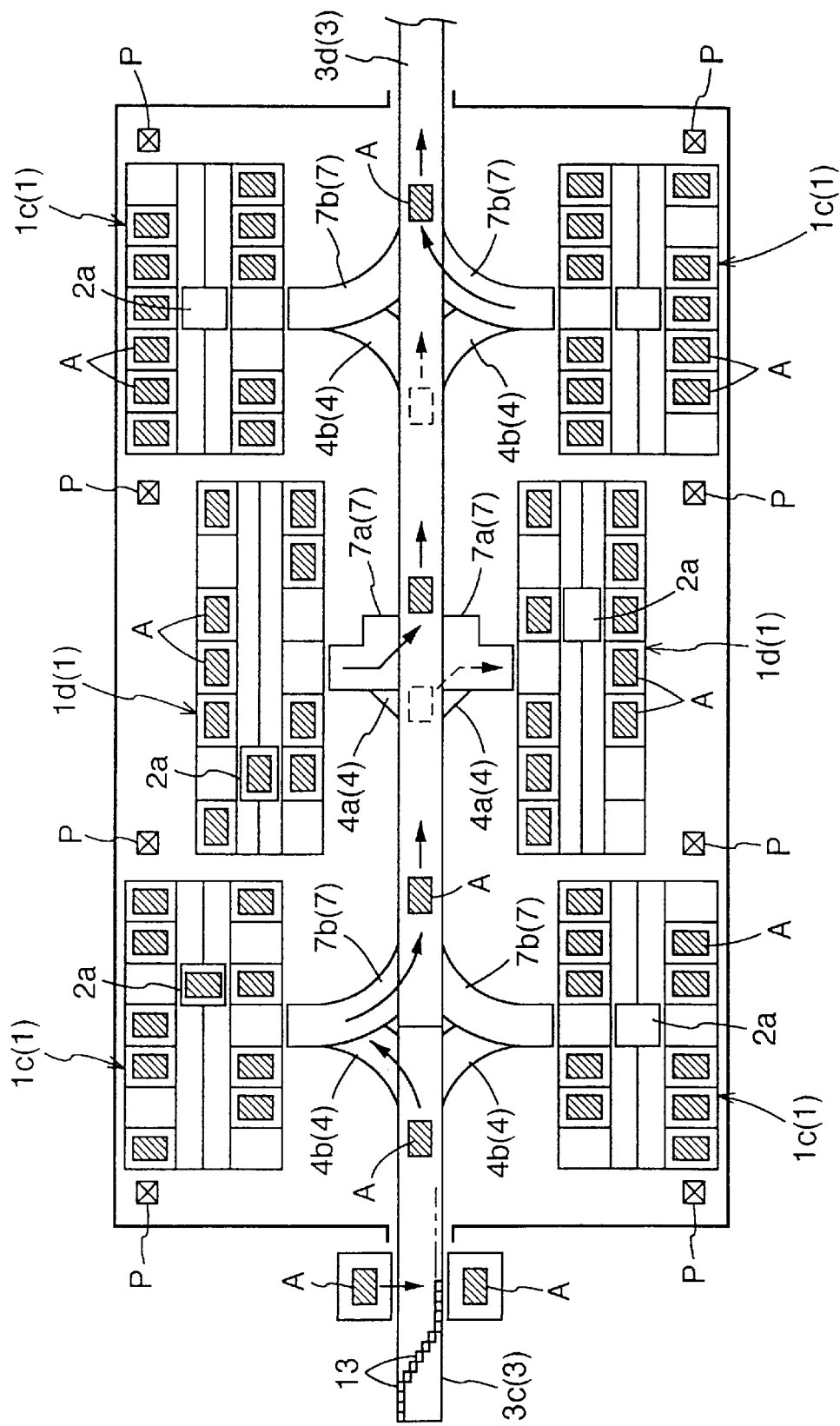
FIG. 13 is an overall plan view of an automated warehouse relating to a second embodiment of the present invention.
Figure 14:
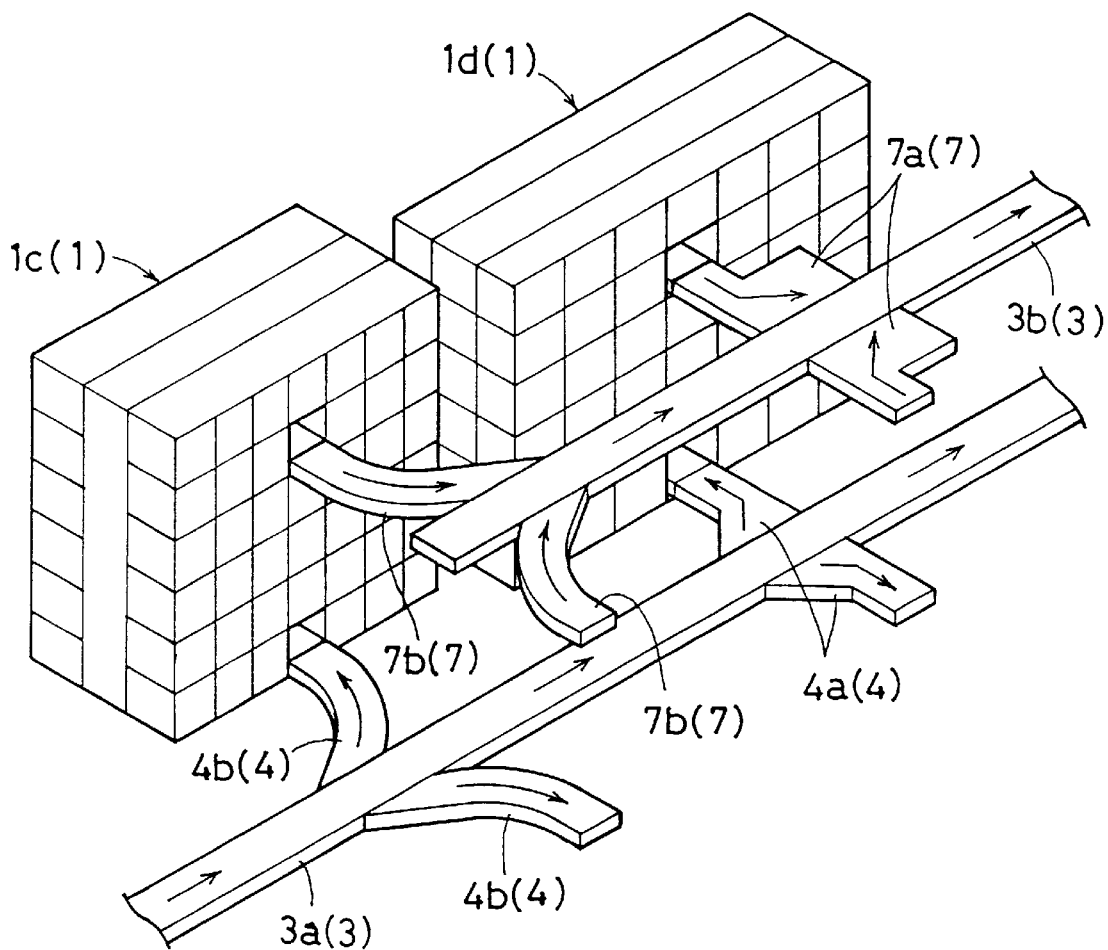
FIG. 14 is a schematic perspective view showing principal portions of the automated warehouse relating to the second embodiment and shown in FIG. 13.

In an automated warehouse relating to a second embodiment shown in FIGS. 13 and 14, the carry-in slat conveyer 3c and the carry-out slat conveyer 3d are disposed in two vertical stages one above the other, with the carry-in slat conveyer 3c being disposed on the lower stage, the carry-out slat conveyer 3d being disposed on the upper stage. And, on opposed sides of these two slat conveyers 3c, 3d, a pair of article storage shelves 1 having entrances thereof facing each other are disposed along the conveying direction of these slat conveyers 3c, 3d.

Of the paired article storage shelves 1, on of them 1 disposed adjacent the slat conveyers 3c, 3d, includes a carry-in entrance disposed on a lower side and a carry-out exit disposed on an upper side; and between each carry-in entrance and the carry-in slat conveyer 3c, the carry-in conveyer 4 is interposed, and the carry-out conveyer 7 is interposed between each carry-out exit and the carry-out slat conveyer 3d, respectively.

Between each paired article storage shelves 1, there is provided a transfer apparatus 2a including a vertically movable frame and a movable table movable along this frame. With this transfer apparatus 2a, the article A located at the carry-in entrance may be carried into the article storage section of the article storage shelf 1, or the article A stored at the article storage section may be carried out to the carry-out exit.

The article storage shelves 1 come in two different types, i.e. an article storage shelf 1c for storing the rectangular articles A in the vertical orientation as viewed from the side of the transfer apparatus 2a and an article storage shelf 1d for storing the same in the lateral orientation. With respect to the presence of the pillars P of the construction, the article storage shelves 1c for storing in the vertical orientation are disposed side on the right and left sides, whereas the storage shelves 1d for storing the articles in the lateral orientation are disposed at the center, respectively.

Then, in the reverse manner from the foregoing embodiment, in correspondence to the carry-in entrance and the carry-out exit of the article storage shelves 1c for storage in the vertical orientation, the diagonal type carry-in conveyer 4b and the diagonal type carry-out conveyer 7b are provided, respectively. And, in correspondence to the carry-in entrance and the carry-out exit of the article storage shelves 1d for storage in the lateral orientation, the orthogonal type carry-in conveyer 4a and the orthogonal carry-out conveyer 7a are provided, respectively.

For carrying the article A into this automated warehouse, if this article A is to be carried into the article storage shelf 1 disposed on the left-hand side relative to the conveying direction of the carry-in slat conveyer 3a, a required number of pushing shoes 13 will be shifted in advance to the right side. For carrying the article into the right-hand storage shelf 1, the shoes will be shifted to the left side. This switchover is effected by a switchover means provided for selectively shifting the respective pushing shoes 13 to the right or left.

Next, an automated warehouse relating to a third embodiment of the invention will be described with reference to FIGS. 15 and 16.

As will become apparent from the following discussion, with the automated warehouse of this modified embodiment, the arrangement of the article storage shelves 1 relative to the main conveyer is different from that of the first embodiment. Further, in this third embodiment, all of the article storage shelves are the type for storing the articles A in the vertical orientation.

In this automated warehouse, a plurality of article storage shelves 1 are paired and disposed with entrances thereof facing each other. Then, a plurality of such paired storage shelves 1 disposed in parallel with each other together form a pair of opposed article storage blocks B1, B2 disposed as shown in FIG. 15.

In each of the article storage blocks B1, B2, between each paired storage shelves 1, there is provided a stacker crane 2 acting as a transfer apparatus movable along the entrances of the storage shelves 1. The construction and function of this stacker crane 2 are the same as those described in the first embodiment.

Between the opposed article storage blocks B1, B2, i.e. on the carry-out sides of the respective article storage shelves 1, there is disposed a main conveyer 3 for carrying in/out the articles A. This main conveyer 3 includes a pair of main conveyer portions 3e, 3f which convey the articles A in the same direction.

Figure 15:
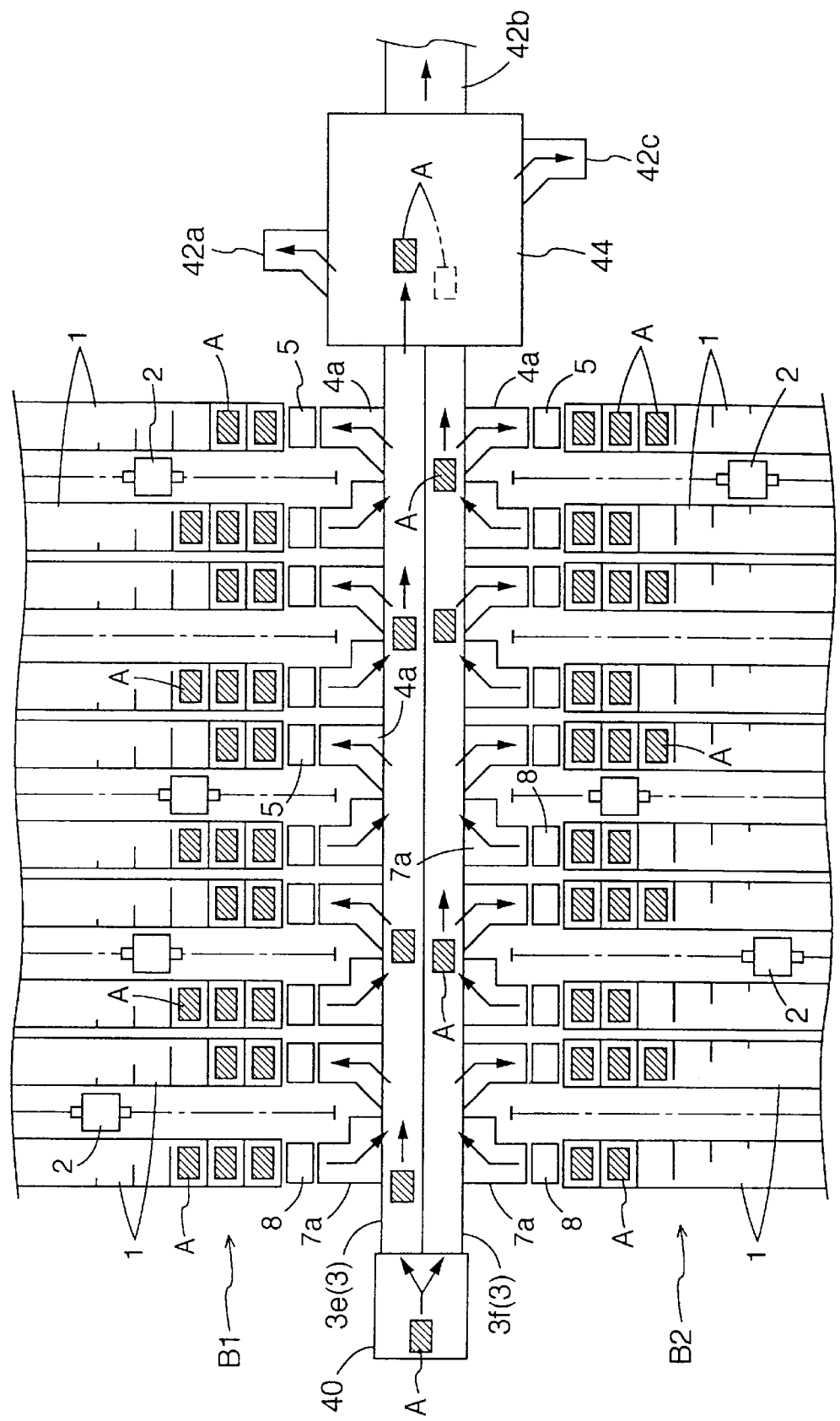
FIG. 15 is an overall plan view of an automated warehouse relating to a third embodiment of the present invention.

And, in FIG. 15, in the left-hand storage block B1, between each of the paired storage shelves 1 and the left-hand main conveyer portion 3e, there are provided a carry-in conveyer 4a for carrying the article A on the main conveyer portion 3e into the stacker crane 2 of the left-hand storage block B1 and a carry-out conveyer 7a for carrying out the article A from the stacker crane 2 to the main conveyer portion 3e, respectively. Further, between the right-hand article storage block B2 and the right-hand main conveyer portion 3f too, identical types of carry-in conveyer 4a and the carry-out conveyer 7a are provided. Accordingly, the carry-in conveyers 4a of the opposed article storage blocks B1, B2 and the carry-out conveyer 7a of the same are disposed in opposition to each other across the main conveyer 3.

Each carry-in conveyer 4a comprises the orthogonal type conveyer for branching in the direction substantially normal to the conveying direction of the main conveyer portions 3e, 3f. And, at the terminal end of this orthogonal type carry-in conveyer 4a in its conveying direction, a carry-in lifter 7 for transferring the article A relative to the stacker crane 2 is provided.

Each carry-out conveyer 7a too comprises the orthogonal type conveyer for carrying out the article A from the direction substantially normal to the conveying direction of the main conveyer portions 3e, 3f. At the terminal end of this orthogonal type carry-out conveyer 7a, a carry-out lifter 8 is provided for transferring the article A relative to the stacker crane 2.

At the starting end of the main conveyer 3 in its conveying direction, there is provided a carry-in conveyer 40 acting as an article carrying-in unit for selectively carrying in the articles A to either of the left and right main conveyer portions 3e, 3f At the terminal end of the main conveyer 3, there is provided a carry-out conveyer 44 acting as a carry-out unit for carrying the articles A conveyed from the opposed main conveyer portions 3e, 3f selectively to a first carry-out portion 42a disposed on the left side, a second carry-out portion 42b disposed at the center, and a third carry-out portion 42c disposed on the right side.

The left and right main conveyer portions 3e, 3f together constituting the main conveyer 3 are both comprised of slat conveyers and these are constructed to be driven at a same conveying speed. The constructions of these main conveyer portions 3e, 3f comprised of slat conveyers are identical. However, as the left-hand main conveyer portion 3e is used for branching the article A to the left side and the right-hand main conveyer portion 3f is used for branching the article A to the right side, the attaching directions of their branching guides 17a and the attaching positions of their turning members 17b are reversed in the right and left directions from each other.

Figure 16:
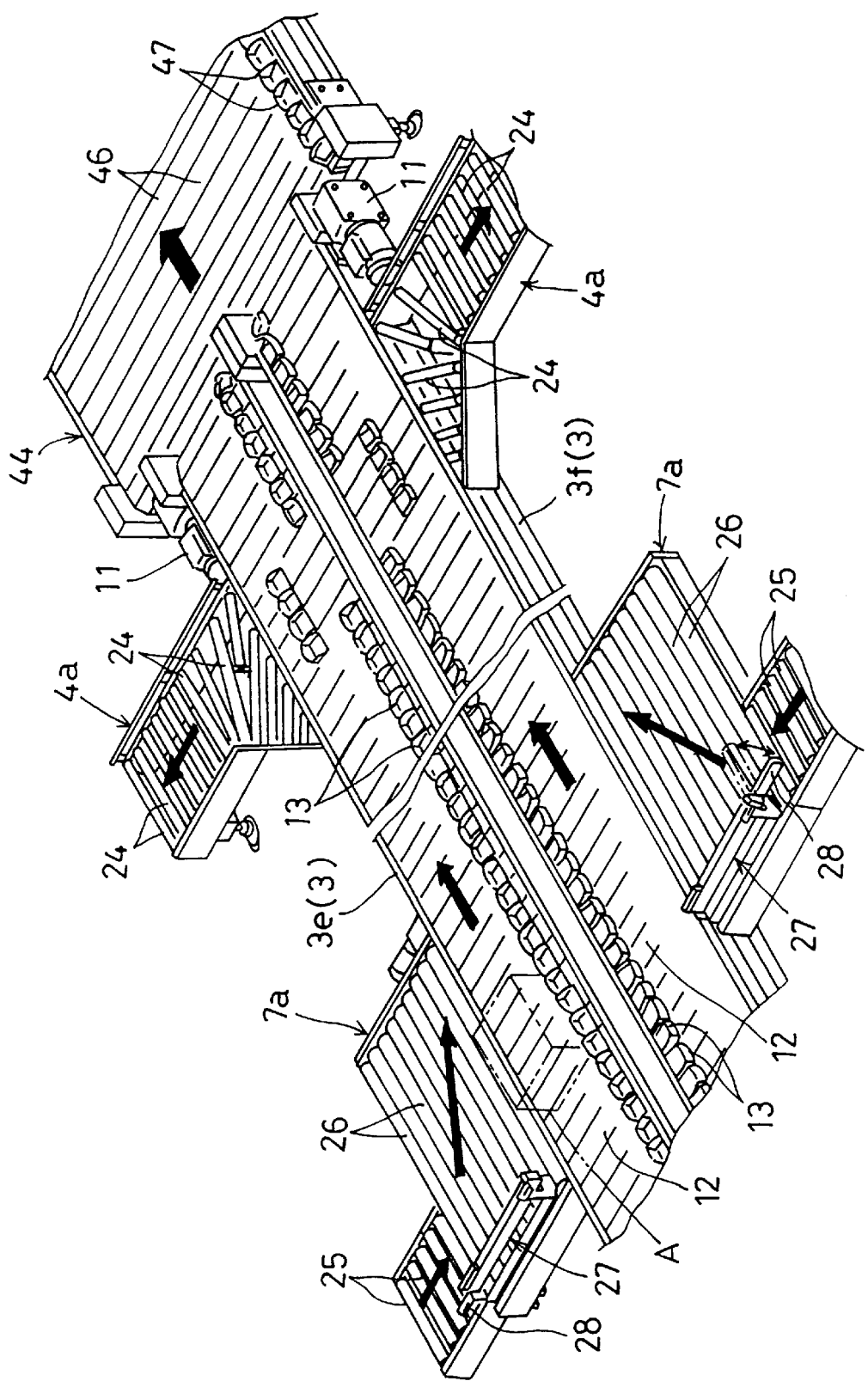
FIG. 16 is a schematic perspective view showing principal portions of the automated warehouse relating to the third embodiment.

And, in each of the two main conveyer portions 3e, 3f, when a pair of right and left chains 10 are rotatably driven by the driving sprockets, the respective slats 12 and the pusher shoes 13 mounted thereon too will be rotatably driven also so as to convey the articles A mounted on the slats 12 at the same speed, respectively Hence, as indicated by arrows in FIG. 16, the articles A will be conveyed diagonally across the second roller conveyer 25 and at a speed synchronized with the conveying speed of the main conveyer portions 3a, 3b from the left side relative to the left-hand main conveyer portion 3e or from the right side relative to the right-hand main conveyer portion 3f, respectively.

The carry-out conveyer 44 too comprises a slat conveyer, like the main conveyer portions 3e, 3f. Though details thereof will not be given, for this conveyer too, such components as the main guide 16, branching guides 17a, return guide 19, turning member 17b and so on are provided. And, as shown in FIG. 16, a carry-out pushing shoe 47 is mounted on a carry-out slat 46 thereof.

For carrying out the article A to the first carry-out portion 42a, a plurality of carry-out pushing shoes 47 will be shifted to the left to be aligned substantially straight along the conveying direction of the carry-out conveyer 44. For carrying out the article to the third carry-out portion 42c, the shoes will be shifted to the right for carrying out the article to this third carry-out portion 42c.

For enabling the above-described operation, each carry-out pushing shoe 47 includes, on the right and left sides thereof, pushing faces for pushing the article in either direction. For carrying out the article to the second carry-out portion 42b, this is effected by means of the conveying force of the carry-out conveyer 44 alone, without using the carry-out pushing shoes 47.

In the third embodiment, like the automated warehouse described hereinbefore in the first embodiment, all the operations are controlled by means of an unillustrated control device using a microcomputer.

Specifically, when the article A is to be carried in from the carry-in conveyer 40, information pertinent to this article A will be inputted to an unillustrated control console. Then, based on this inputted information, the control device will specify the article storage block B1 or B2 into which the article A is to be carried and further specify a particular shelf 1 in that block and its storage section as well.

Then, based on the above specification, the carry-in conveyer 40 will selectively carry the article A either to the left or the right to transfer the article onto one of the main conveyer portions 3e, 3f. The subsequent control process is the same as that described hereinbefore in the first embodiment.

For carrying out the article A, information pertinent to this article A will be inputted to the control device. Then, based on this inputted information, the control device will specify the article storage block B1 or B2 in which the target article is being stored and specify also its shelf 1 and storage section.

Thereafter, in the reverse manner from the above-described process for carry-in operation, the stacker crane 2 will carry out the article A from the specified storage section of the specified storage shelf 1 and transfer it onto the carry-out lifter 8. Subsequently, the carry-out lifter 8 will be lowered to transfer the article onto the orthogonal type carry-out conveyer 7a.

Then, based on a signal from an unillustrated article-presence detecting means provided on the second roller conveyer 25 of the orthogonal type carry-out conveyer 7a, the pushing member 26 and the pushing element 27 will be actuated to carry out the article A onto either the main conveyer portion 3e or 3f at a speed synchronized with the conveying speed of the main conveyer portions 3e, 3f.

And, based on information as to which of the first through third carry-out portions 42a, 42b, 42c the article A is to be carried out, the carry-out pushing shoes 47 have already been shifted to the right or left. For carrying out to the first carry-out portion 42a, the shoes shifted in advance to the right will then be shifted to the left to carry out the article to the first carry-out portion 42a.

For carrying out to the third carry-out portion 42c, the carry-out pushing shoes 47 shifted in advance to the left will now be shifted to the right to carry out the article to the third carry-out portion 42c. On the other hand, for carrying out to the second carry-out portion 42b, the shoes 47 will not be shifted, and the article will be carried directly by means of the carry-out conveyer 44 to the second carry-out portion 42b.

In the third embodiment described above, the main conveyer 3 is comprised of the pair of main conveyer portions 3e, 3f which are slat conveyers; and each of these main conveyer portions 3e, 3f is driven by means of the electric motor 11 provided respectively thereto. Instead, these two main conveyer portions 3e, 3f may be driven by a single common electric motor, so as to reduce the costs.

Figure 17:
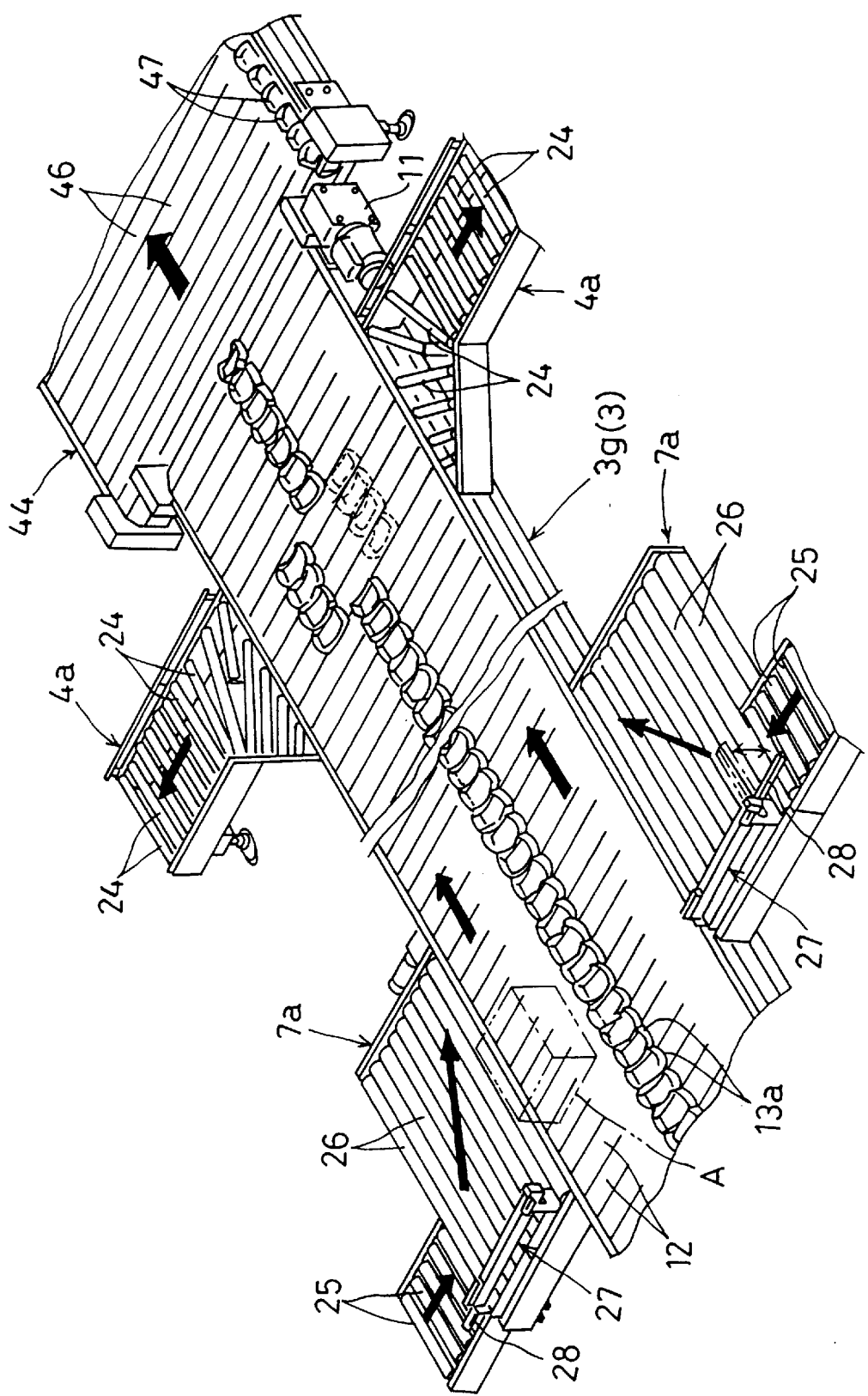
FIG. 17 is a schematic perspective view showing principal portions of an automated warehouse relating to a fourth embodiment of the present invention.

Further alternatively, the main conveyer 3 may be comprised of a single slat conveyer driven by a single electric motor. Further, this single slat conveyer may include pushing shoes 13 for pushing the article A to the left and further pushing shoes 13 for pushing the same to the right. Moreover, the conveyer may utilize the same shoes for both directions. Such modified construction is shown in FIG. 17.

Next, this fourth embodiment of the present invention will be described with reference to FIG. 17. The respective components of this embodiment are almost identical to those of the third embodiment described above. Hence, details thereof will not be given in repetition, and same reference marks or numerals will be used in the following description.

In this fourth embodiment, the entire main conveyer 3 comprises a single slat conveyer in which a plurality of slats 12 are mounted between a pair of right and left chains 10 driven by a single electric motor 11, and each slat 12 mounts a single pushing shoe 13a.

Three main guides 16 are provided at the center and right and left sides relative to the width of a main conveyer 3g. Between the center main guide 16 and the right and left main guides 16, there are respectively provided return guides 19. Further, in correspondence to each orthogonal type carry-in conveyer 4a, such components as the plurality of branching guides 17a, turning member 17b, air cylinder 20 and so on are provided.

For transferring the article A conveyed from the main conveyer 3a onto the left-hand orthogonal type carry-in conveyer 4a for instance, with operation of the turning member 17b by the air cylinder 20, a plurality of pushing shoes 13a aligned substantially straight along the conveying direction of the main conveyer 3g, the transferring operation will be effected with pushing the article A from the center to the left. Thereafter, these pushing shoes 13a used for this transferring operation of the article A will be returned toward the central main guide 16 by means of the return guide 19.

According to this fourth embodiment, only one electric motor 11 is required; and the pushing shoes 13a may be commonly utilized for transferring operations in the two directions. Hence, further cost reductions will be made possible.

However, as the same pushing shoe 13a needs to push the article to the two directions, i.e. to the left and to the right, each shoe 13a includes pushing faces on the right and left sides thereof In this respect, this embodiment differs from the foregoing embodiments.

In the third and fourth embodiments described above, the carry-out conveyer 7a comprises an orthogonal type carry-out conveyer. Instead, this carry-out conveyer 7a may comprise a roller conveyer having a number of rollers, which conveyer extends diagonally toward and eventually joins the main conveyer 3 from the diagonally rear side thereof.

Next, an automated warehouse according to a fifth embodiment of the present invention will be described with reference to FIGS. 18 and 19.

Figure 18:
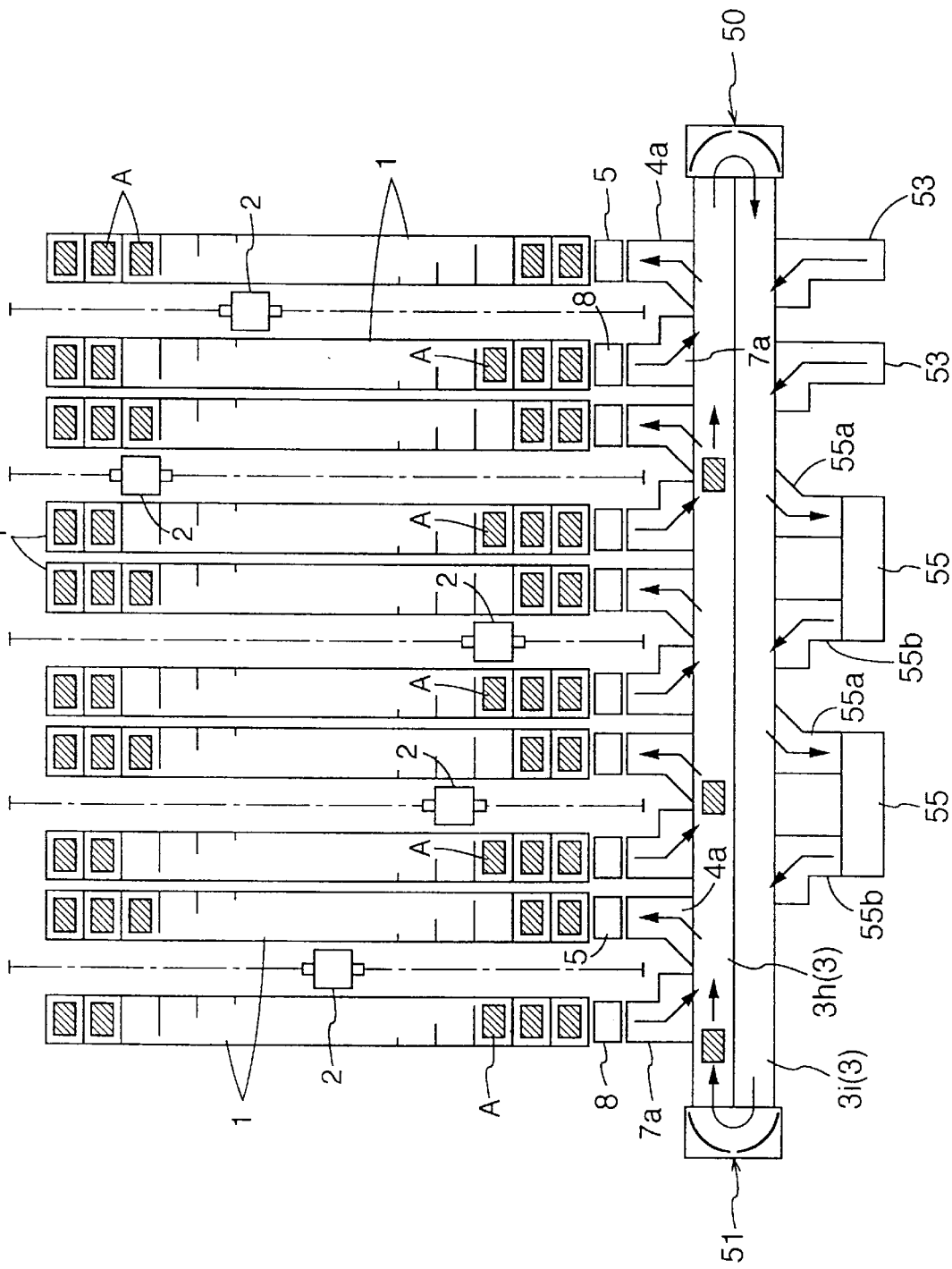
FIG. 18 is an overall plan view of an automated warehouse relating to a fifth embodiment of the present invention.
Figure 19:
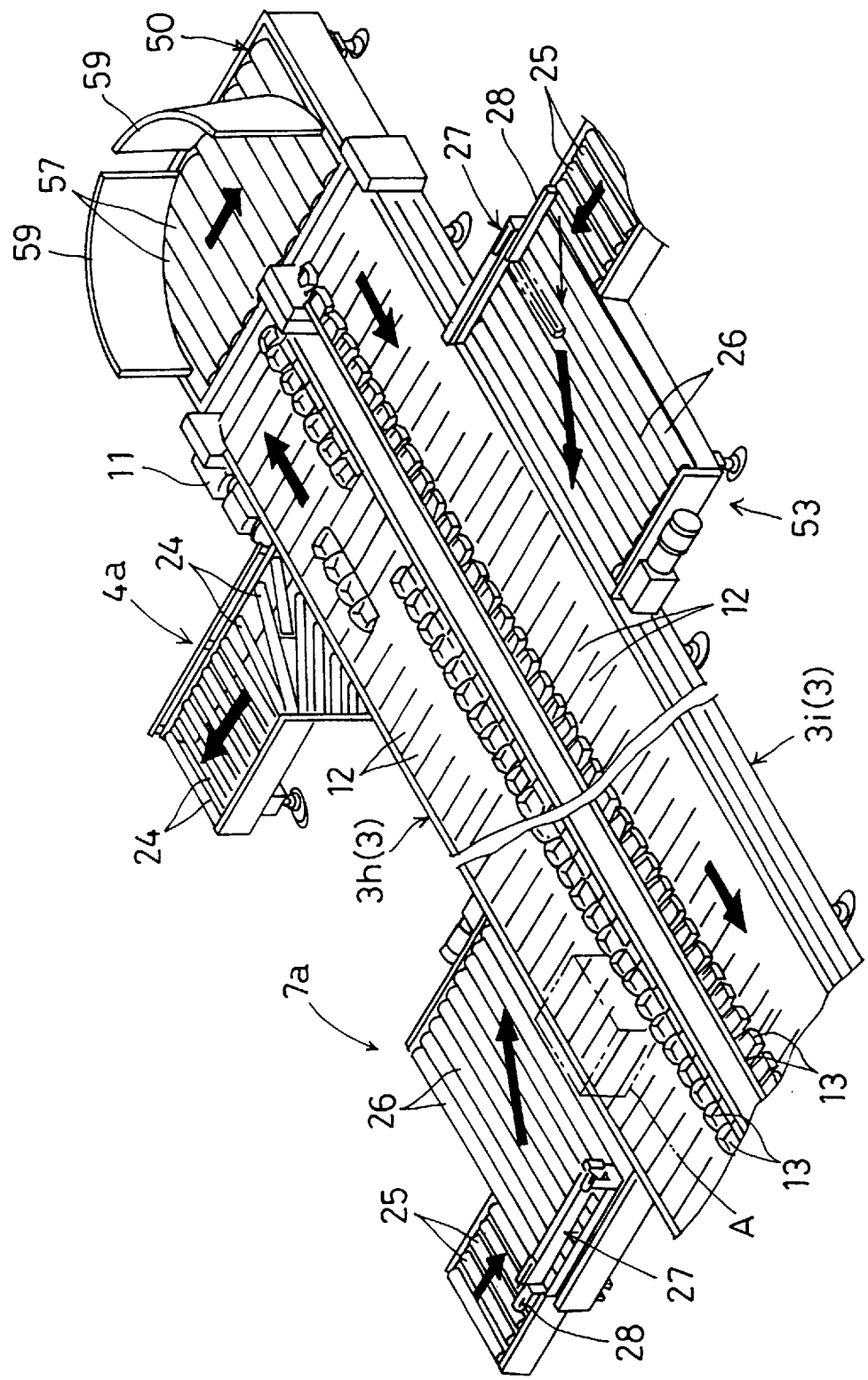
FIG. 19 is a schematic perspective view showing principal portions of the automated warehouse according to the fifth embodiment shown in FIG. 18, FIGS. 20(A) and (B) show a modified embodiment of switchover means, FIGS. 21(A) and (B) show a further modified embodiment of the switchover means, FIGS. 22(A) and (B) are side views showing the switchover means of the embodiment shown in FIG. 21, FIGS. 23(A) and (B) are descriptive views showing a still further embodiment of the switchover means.

In this automated warehouse, as shown in FIG. 18, a plurality of article storage shelves 1 as article storing apparatuses are disposed in pairs and in parallel with each other with entrances thereof facing each other. Between each paired article storage shelves 1, there is provided a stacker crane 2 acting as a transfer apparatus movable along the entrances of the shelves 1. All of the article storage shelves 1 are the vertical type for storing the articles A in the vertical orientation.

According to the characterizing feature of this fifth embodiment, on the carry-out side of each article storage shelf 1, there is provided a loop-type main conveyer 3 for carrying out the articles A. Between each paired storage shelves 1 and the main conveyer 3, there are provided a carry-in conveyer 4a for carrying in the article A on the main conveyer 3 to the stacker crane 2 and a carry-out conveyer 7a for carrying out the article A from the stacker crane 2 to the main conveyer 3, respectively.

The carry-in conveyer 4a comprises the orthogonal type conveyer, at the terminal end of which a carry-in lifter 5 is provided for transferring the article A with the stacker crane 2.

The carry-out conveyer 7a too comprises the orthogonal type conveyer, at the starting end of which a carry out the article A with the stacker crane 2.

The main conveyer 3 includes a shelf-side slat conveyer 3h as a conveyer portion disposed adjacent the article storage shelves 1, and a load-handling side slat conveyer 8i as a further conveyer portion disposed adjacent the shelf-side slat conveyer 3h and having a conveying direction opposite to that of the conveyer 3h. In operation, the carry-in conveyer 4 or the carry-out slat conveyer 7a will carry in or out the article A to or from the shelf-side slat conveyer 3h.

For the load-handling side slat conveyer 3i, there is provided a carry-in conveyer 53 acting as an article carry-in unit for carrying in the article A; and there are also provided a conveyer 55a acting as an article carry-out unit for carrying out the article A to a load-handling area 55 and a conveyer 55b acting as an article carry-in unit for carrying in the article A after handling thereof.

The pair of slat conveyers 3h, 3i which are disposed adjacent with the conveying directions thereof opposite from each other are driven at a same conveying speed. Further, these conveyers 3h, 3i are connected respectively at opposed ends thereof by a turn conveyer 50 for transferring the article A from the shelf-side slat conveyer 3h to the load-handling side slat conveyer 3i with turning its direction 180 degrees while maintaining its horizontal or lateral orientation thereof and a turn conveyer 51 for transferring the article A from the load-handling side slat conveyer 3i to the shelf-side slat conveyer 3h with turning its direction 180 degrees while maintaining its horizontal or lateral orientation thereof. The pair of slat conveyers 3h, 3i and the pair of turn conveyers 50, 50 together constitute the main conveyer 3.

In this fifth embodiment, the two turn conveyers 50, 51 are of an identical construction. Specifically, as shown in FIG. 19, each of these conveyers 50 or 51 includes a plurality of drive rollers 57 and a substantially semicircular guide frame 59. As the respective rollers 57 are driven to rotate in synchronism by means of an unillustrated electric motor, the conveying force of the drive rollers 57 and the guiding action of the guide frame 59 cooperate to convey the article A with 180 degree change in its direction and with maintaining its lateral orientation.

In this fifth embodiment too, the operations of all components are controlled by a control device using a microcomputer.

As this control scheme is substantially identical to that described hereinbefore in the first embodiment, this will not be described here again.

The difference between this embodiment and the foregoing embodiments lies in that for effecting a certain process on the article this article A will be branch-transferred onto the conveyer 55a of the load-handling area 55 and the article A will then be conveyed on this conveyer 55a to the load-handling area 55.

When the control console is operated after completion of the load-handling operation on the article A, the conveyer 55b of the load-handling area 55 will transfer the article A onto the load-handling side slat conveyer 3i, so that this article A after the handling thereof will carried again into the original storage section of the original article storage shelf 1. This completes the entire load handling operation.

In this fifth embodiment, the turn conveyers 50, 51 constituting the main conveyer 3 are comprised respectively of the plurality of drive rollers 57 and the substantially semicircular guide frame 59. About these turn conveyers 50, 51 too, many modifications will be possible. These conveyers do not necessarily need to convey the article A with changing its direction by 180 degrees with maintaining its lateral orientation.

As discussed above, various modifications will be apparent for those skilled in the art to the specific embodiments of the automated warehouse according to the present invention as long as such modifications depart from the essential spirit of the invention. In addition to such modifications, other minor changes may be made as described below.

Figure 20:
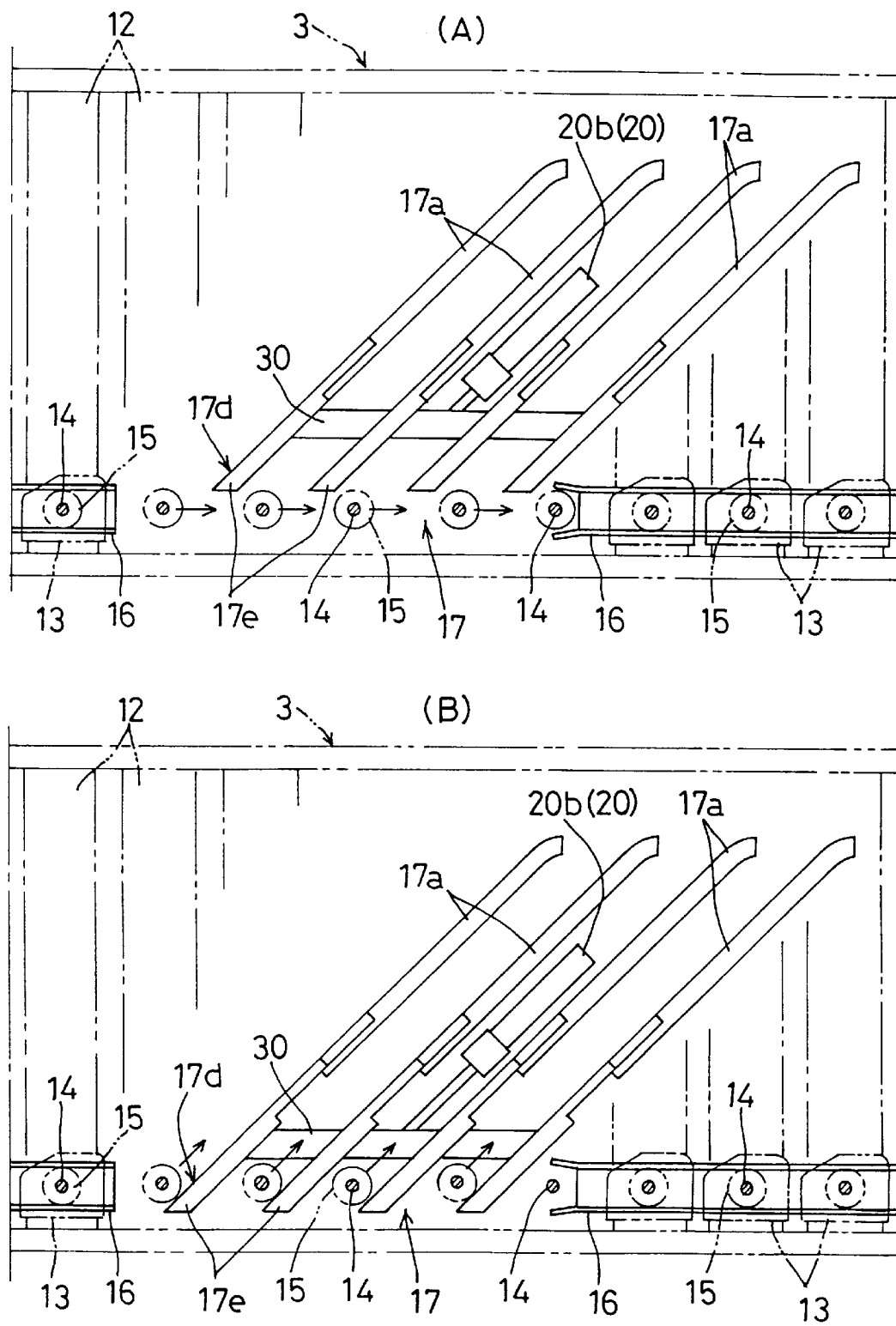

In the plurality of foregoing embodiments described above, the plurality of turning members 17c cause the orthogonal-turning elements 17b formed integral therewith to project toward the main guide 16 so as to turn the guide rollers 15 toward the orthogonal-branching guides 17a. Instead, as shown in FIG. 20, portions of the orthogonal-branching guides 17a may be adapted to be slidable relative to the reset of the guides 17a, so that these slidable portions respectively provide switchover means 17e.

In this case, each switchover means 17e includes an inclined guide face 17d and the respective switchover means 17e will be connected with each other by means of a branching-guide connecting member 30, which is caused to slide toward the main guide 16 by means of an orthogonal-branching guide-moving air cylinder 20b. In operation, as illustrated in FIG. 20(B), the guide rollers 15 having been moved along the main guide 16 will be caused to come into abutment against the inclined guide faces 17d to be turned toward the orthogonal-branching guides 17a.

Incidentally, in this embodiment, the orthogonal-branching guide 17a may include an inclined guide face 17d on the side of the main guide 16, so that the entire respective orthogonal-branching guides 17a may be slid together at one time.

In this further embodiment, the guide rollers 15 are turned toward the orthogonal-branching guides 17a by the guiding action of the inclined guide face 17d. Instead, a further construction will be possible as described next.

Figure 21:
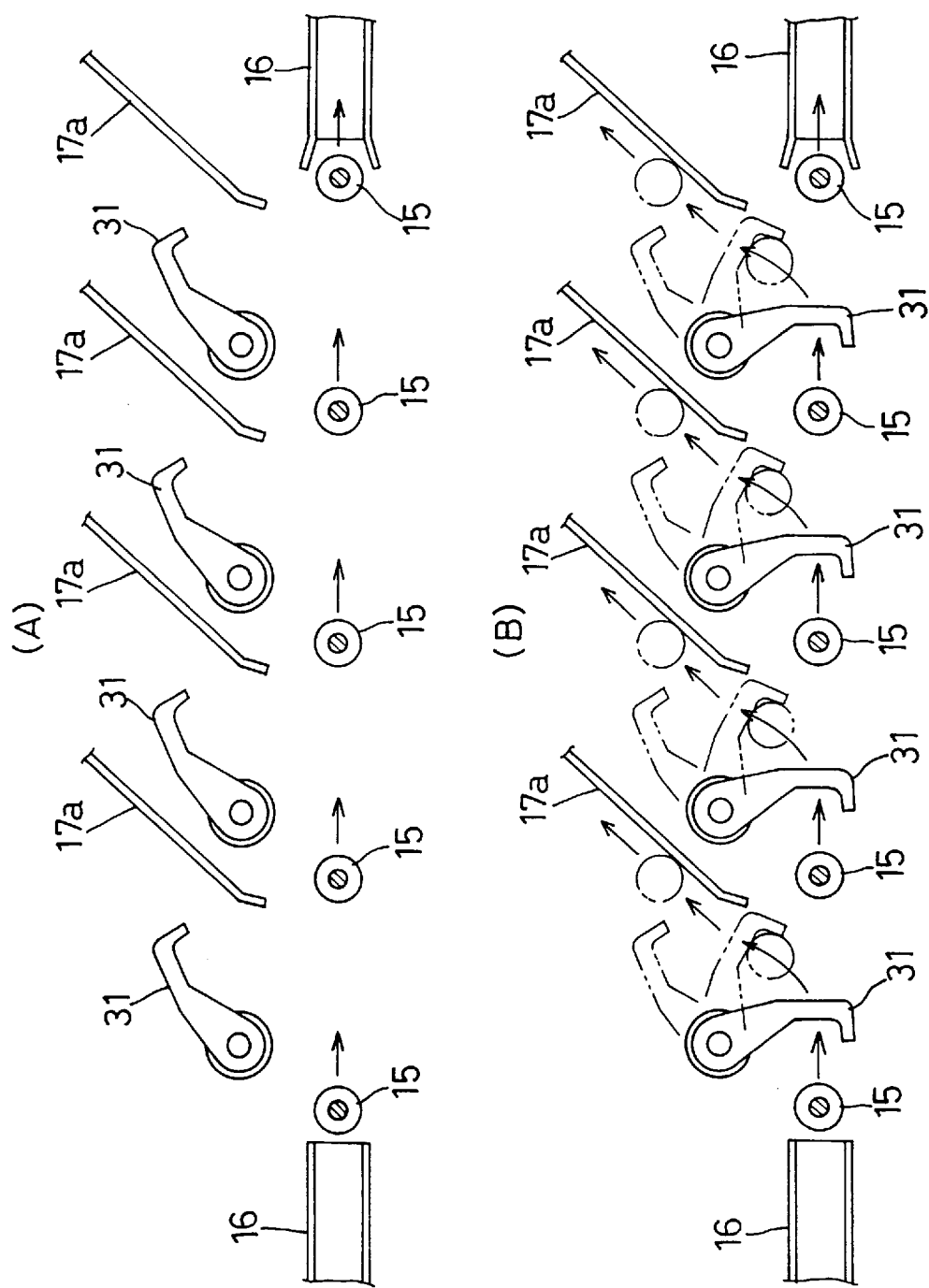
Figure 22:
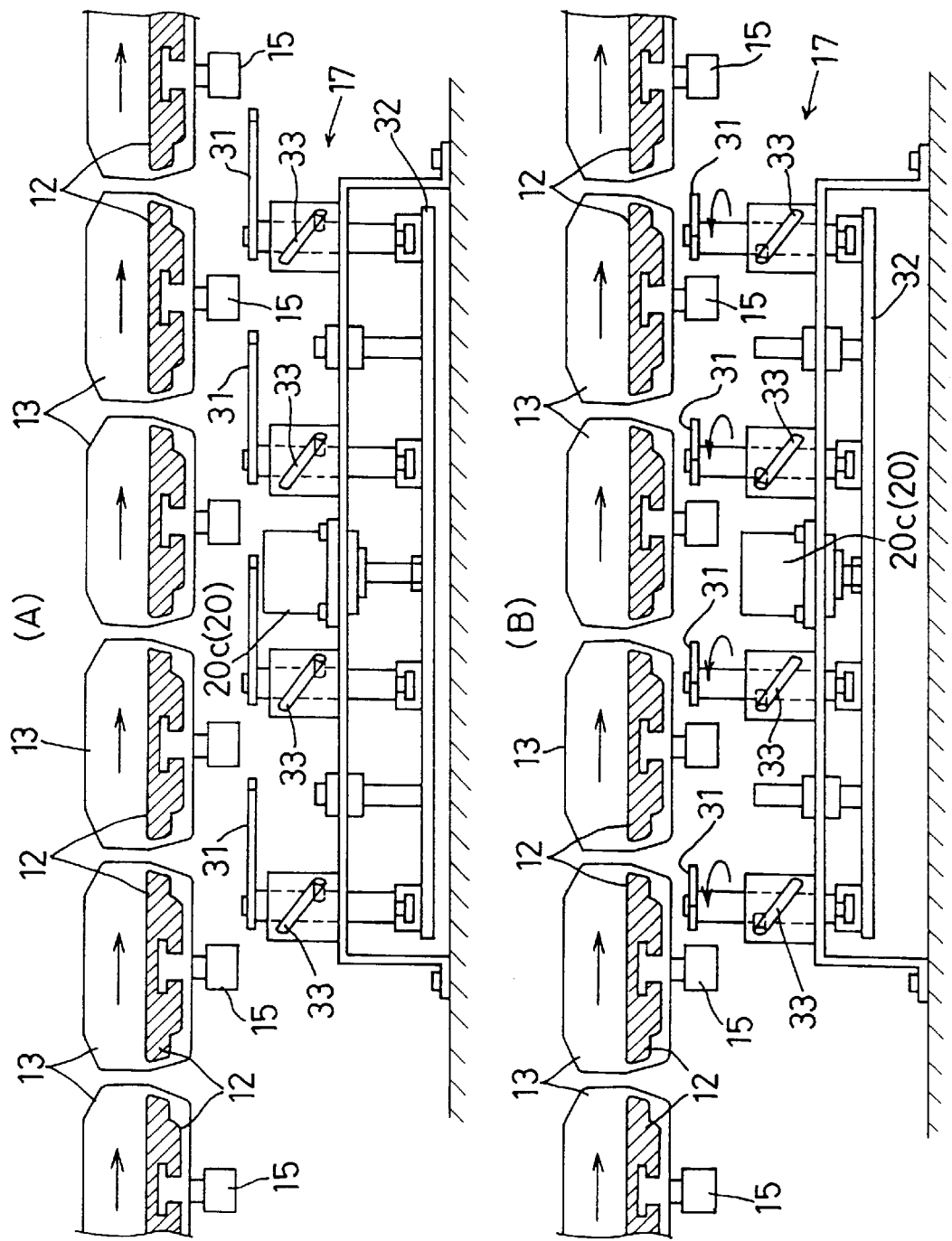

Namely, as shown in FIGS. 21 and 22, a pivotal pawl 31 is provided as a switchover means against which the guide roller 15 comes into abutment to be turned thereby toward the orthogonal-branching guide 17a. And, a plurality of pivotal pawls 31 are connected together with a pivotal-pawl connecting member 32, which member 32 may be switched over by means of an orthogonal-branching actuator cylinder 20c acting as the drive means 20 between an upper operative position and a lower inoperative position.

In its lower inoperative position, each pivotal pawl 31 is placed under a condition illustrated in FIG. 21(A) or FIG. 22(A). When switched over to the upper operative position, the pivotal pawl 31 will be pivoted upward. Then, with a function of a pivot groove 33 associated with the upper pivotal movement of the pawl, the pawl will be pivoted into a further condition illustrated in FIG. 21(B) or FIG. 22(B), so that the pawl will project toward the main guide 16. In this operative condition or position, when the plurality of guide rollers 15 having been moved along the main guide 16 come into contact with the respective pivotal pawls 31, these pawls 31 will be pivoted toward the orthogonal-branching guides 17a against urging forces of unillustrated springs and also moved downward by the function of the pivot grooves 33, so that the respective guide rollers 15 will be turned in direction from the side of the main guide 16 to the side of the orthogonal-branching guides 17a.

Further, as shown in FIGS. 23 and 24, a sprocket 34 and an arm 35 both for turning may be rotatably mounted on the pin 14 projecting downwardly from each pushing shoe 13. And, a guide roller 115 may be attached to the leading end of the arm 35.

In this case, a single turning chain 36 engaged with the turning sprockets 34 will act as the switchover means and this chain will be projectable and retractable relative to the main guide 16 by means of a sprocket-moving air cylinder 20d acting as the drive means 20. In the operative condition in which the turning chain 36 is projected toward the main guide 16, when each turning sprocket 34 come into engagement with the chain 36, the sprocket 34 will be rotated relative to the chain 36 which is held stationary. With this rotation of the sprocket, the arm 35 and the guide roller 115 mounted on this arm 35 too will be rotated together. Consequently, as shown in FIG. 23(B), each guide roller 115 will be turned toward the orthogonal-branching guide 17a.

In the first embodiment, in connection with the presence of the pillars P in the premises, the article storage shelves 1a for storing the articles A in the vertical orientation and the article storage shelves 1b for storing the same in the lateral orientation are provided in a mixed state. Instead, in the automated warehouse shown in FIG. 1, all the article storage shelves 1 may be the article storage shelves 1a for storing the articles A in the vertical orientation; and all the carry-in conveyers for carrying in the articles into these shelves 1a may comprise the orthogonal type carry-in conveyers 4a. Further, in the automated warehouse shown in FIG. 3, all the article storage shelves 1 may comprise the latter type of shelves 1d for storing the articles in the lateral orientation; and all the carry-in conveyers for carrying in the articles into these shelves 1d may comprise the orthogonal type carry-in conveyers 4a.

Further, the shelves 1a for storing the articles in the vertical orientation in order to suit a particular shape of the construction, the storage shelves 1a for storage in the vertical orientation and the storage shelves 1b for storage in the lateral orientation may be appropriately disposed in a modified arrangement, with the orthogonal type carry-in conveyers 4a and the diagonal type carry-in conveyers 4b being disposed in correspondence therewith respectively.

In the foregoing embodiments, the plurality of article storage shelves 1 are disposed side by side with the respective entrances thereof being substantially parallel with each other. The particular arrangement of these shelves 1 may be modified in any other manner to suit e.g. a particular shape of the construction in which they are disposed.

In the foregoing embodiments, for each slat 12, a pushing shoe 13 is provided. Instead, a pushing shoe 13 may be provided for every other slat 12. Or, the shoe 13 need not necessarily be provided for each slat 12.

Further, in the foregoing embodiments, the carry-in conveyers 4 comprises roller conveyers each having a number of rollers. Alternatively, these carry-in conveyers 4 may comprise chain conveyers each including a pair of right and left rotatable drive chains.

In the foregoing embodiments, the pushing shoe 13 is mounted on each slat 12. Instead, separately from the slat 12, there may be provided a support member for supporting the pushing shoe 13, with the support member being mounted between the right and left chains 10.

The present invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. An automated warehouse comprising:

a plurality of article-storage apparatuses having a plurality of article-storage sections for storing articles therein;

a plurality of transfer apparatuses movable along the length of the article-storage apparatuses for transferring the articles to and from the respective article-storage sections;

a main conveyer for transferring the articles; and a plurality of branching conveyers, each of which corresponds to only one of said transfer apparatuses, for conveying the articles between the main conveyer and the corresponding one of the transfer apparatuses, wherein the main conveyer comprises a slat conveyer including a plurality of slats for conveying the articles mounted thereon and a plurality of pushing shoes movable along and together with the respective slats, at least some of the plurality of branching conveyers comprises orthogonal type branching conveyers which extend substantially normal to the conveying direction of the main slat conveyer, and the automated warehouse further comprises switchover means for moving a predetermined number of the pushing shoes toward the branching conveyer with the shoes aligned substantially straight along the conveying direction of the main slat conveyer, wherein the articles include a fore-aft direction that is parallel to the conveying direction of the main slat conveyer when the articles are on the main slat conveyer, and wherein the articles are shifted by the pushing shoes to the orthogonal type branching conveyers such that the articles are conveyed on the orthogonal type branching conveyers in a lateral direction perpendicular to the fore-aft direction of the articles such that the fore-aft direction of the articles on the orthogonal type branching conveyers is parallel to the conveying direction of the main slat conveyer.

2. The automated warehouse according to claim 1, wherein said plurality of article-storage apparatuses are arranged with the lengths thereof being parallel with each other; and said main conveyer includes a carry-in main conveyer disposed at one longitudinal end of the plurality of article-storage apparatuses and a carry-out main conveyer disposed on the opposite longitudinal end of the plurality of article-storage apparatuses.

3. The automated warehouse according to claim 1, wherein said plurality of article-storage apparatuses are arranged with the lengths thereof being parallel with each other and include one block and a further block; and said main conveyer is disposed between said one block and said further block.

4. The automated warehouse according to claim 3, wherein said main conveyer includes a main conveyer portion disposed adjacent said one block and a further main conveyer portion disposed adjacent said further block; and said two main conveyer portions convey the articles in a same direction.

5. The automated warehouse according to claim 1, wherein some of said plurality of branching conveyers comprise carry-in conveyers for carrying in the articles on the main conveyer to the transfer apparatuses and others of said plurality of branching conveyers comprise carry-out conveyers for carrying out the articles on the transfer apparatuses to the main conveyer.

6. The automated warehouse according to claim 1, wherein said main conveyer includes a pair of conveyer portions disposed side by side with the conveying directions of the slats being reverse from each other and a pair of turn conveyers which interconnect said pair of conveyer portions at opposed ends thereof; and said main conveyer including said conveyer portions and said turn conveyers provide a conveying path in the form of a loop.

7. The automated warehouse according to claim 1, wherein said switchover means is displaceable by a single drive means between an operative position for guiding said predetermined number of pushing shoes and an inoperative position for not guiding the pushing shoes.

8. The automated warehouse according to claim 1, wherein said switchover means includes a predetermined number of branching guides in correspondence with said predetermined number of pushing shoes; and each said branching guide has a width sufficient for moving the pushing shoe substantially from one side to the other side along the width of the slat conveyer and includes a guide face inclined relative to the conveying direction.

9. The automated warehouse according to claim 1, wherein all of said plurality of branching conveyers are said orthogonal type branching conveyers.

10. The automated warehouse according to claim 8, wherein the switchover means has a turning member movable in a horizontal direction and actuated by a single actuator, and wherein the turning member shifts the predetermined number of pushing shoes toward corresponding the branching guides simultaneously.

11. The automated warehouse according to claim 1, wherein each of the orthogonal type branching conveyers has a plurality of rollers driven in synchronism with each other.

12. The automated warehouse according to claim 1, wherein each of the orthogonal type branching conveyers has a stopper extending substantially perpendicular to the conveying direction of the main conveyer, the stopper projecting upwardly from an article conveying surface of a corresponding one of the orthogonal type branching conveyers and being adapted to abut the side face of the articles to maintain the articles on the orthogonal type branching conveyers as the articles are pushed by the pushing shoes from the main conveyer to the orthogonal type branching conveyers.

13. The automated warehouse according to claim 1, wherein at least one of the orthogonal type branching conveyers conveys the articles from a corresponding one of the transfer apparatus and has a pusher member adapted to abut one side face of an article to push the article along the conveying direction of the main conveyer.

14. The automated warehouse according to claim 13, wherein the at least one of the orthogonal type branching conveyers further has a push rail adapted to abut a side face different from the one side face of the article to push the article toward the main conveyer while the article is being pushed in the conveying direction of the main conveyer by the pusher member.

15. An automated warehouse comprising:

a plurality of article-storage apparatuses having a plurality of article-storage sections for storing articles therein;

a plurality of transfer apparatuses movable along the length of the article-storage apparatuses for transferring the articles to and from the respective article-storage sections;

a main conveyer for transferring the articles; and a plurality of branching conveyers, each of which corresponds to only one of said transfer apparatuses, for conveying the articles between the main conveyer and the corresponding one of the transfer apparatuses, wherein the main conveyer comprises a slat conveyer including a plurality of slats for conveying the articles mounted thereon and a plurality of pushing shoes movable along and together with the respective slats, at least some of the plurality of branching conveyers comprises orthogonal type branching conveyers which extend substantially normal to the conveying direction of the main slat conveyer, and the automated warehouse further comprises switchover means for moving a predetermined number of the pushing shoes toward the branching conveyer with the shoes aligned substantially straight along the conveying direction of the main slat conveyer, wherein the articles are positioned in a first directional orientation relative to the conveying direction of the main slat conveyer when the articles are on the main slat conveyer and wherein the articles are maintained in the first orientation when on the orthogonal type branching conveyers.

* * * * *